United States Patent [19]

Massey et al.

[11] 4,374,540
[45] Feb. 22, 1983

[54] PNEUMATIC TRANSPORT AND HEAT EXCHANGE SYSTEMS

[75] Inventors: Lester G. Massey, Moreland Hills, Ohio; Lawrence G. Clawson, Dover; Andrew J. Syska, Marblehead, both of Mass.

[73] Assignee: Consolidated Natural Gas Service Company, Inc., Pittsburgh, Pa.

[21] Appl. No.: 76,289

[22] Filed: Sep. 7, 1979

Related U.S. Application Data

[63] Continuation-in-part of Ser. No. 942,677, Sep. 15, 1978, abandoned.

[51] Int. Cl.³ ............................................. F28D 19/02
[52] U.S. Cl. ...................................... 165/1; 165/39; 165/104.18; 165/104.15; 406/106
[58] Field of Search ............ 165/107 R, 39, 1, 104.15, 165/104.18; 406/106

[56] References Cited
U.S. PATENT DOCUMENTS

| | | |
|---|---|---|
| 2,408,943 | 10/1946 | Mekler . |
| 2,517,042 | 8/1950 | Skelly . |
| 2,614,028 | 10/1952 | Schaumann ............... 165/107 R X |
| 2,698,171 | 12/1954 | Schoenmabers et al. .... 165/107 R X |
| 3,125,158 | 3/1964 | Schluderberg . |
| 3,263,346 | 8/1966 | Vandenhoeck . |
| 3,283,810 | 11/1966 | Sonnenschein et al. . |
| 3,305,939 | 2/1967 | Sonnenschein et al. .... 165/107 R X |
| 3,850,582 | 11/1974 | Luckenbach . |
| 3,876,383 | 4/1975 | Vandenhoeck . |
| 3,923,642 | 12/1975 | Luckenbach et al. . |
| 3,959,117 | 5/1976 | Bunn et al. . |
| 3,964,876 | 6/1976 | James . |
| 3,970,587 | 7/1976 | Shinnar et al. . |
| 3,990,857 | 11/1976 | Vandenhoeck . |
| 3,996,013 | 12/1976 | Luckenbach et al. . |
| 4,158,385 | 6/1979 | Vandenhoeck . |

FOREIGN PATENT DOCUMENTS

| | | |
|---|---|---|
| 636892 | 4/1937 | Fed. Rep. of Germany ... 165/107 R |
| 200697 | 10/1967 | U.S.S.R. .......................... 165/107 R |

OTHER PUBLICATIONS

Knowlton et al., T. M., *Solids Flow Control Using a Nonmechanical L-Valve*, Institute of Gas Technology, Chicago, Ill., O-36, 11/1977.
"Heat Exchangers with Moving, Dispersed Bed, Heat Exchange Medium", Z. R. Gorbis, V. A. Kalienderian, published by Isdatielstro "Energia", 1975.
*Pneumatic Conveying and Transporting*, C. Y. Wen and William A. O'Brien, in Gas-Solids Handling in the Process Industries, edited by Marchello & Gomezplata, Marcel Dekker, Inc., 1966, pp. 111–112.
*Fluidization and Fluid-Particle Systems*, Zenz and Othmer, Reinhold Publishing Corporation, 1960, pp. 343–348.

Primary Examiner—Albert W. Davis, Jr.
Attorney, Agent, or Firm—Pearne, Gordon, Sessions, McCoy & Granger

[57] ABSTRACT

Gas-solids transport and heat exchange techniques are disclosed wherein solid particulate material is circulated in a "figure 8" or a circular flow path for selective contact and/or direct heat exchange with gaseous media. The particulate material is introduced into streams of gaseous media at spaced locations in the flow path and subsequently separated from the gaseous streams following contact and/or heat exchange therewith. The gaseous streams are maintained separate from one another by loose packed bed columns of particulate material formed in the flow path and used to introduce the particulate material into the gaseous streams. The flow rate of the particulate material is regulated by the controlled biasing of particulate material from each of the columns thereof directly into the gaseous streams, and the particulate material is circulated solely through the use of the gaseous media and the force of gravity. The particulate material is circulated in cocurrent relationship with each of the gaseous streams in figure 8 flow path systems and, in circular flow path systems, the particulate material is circulated in cocurrent relationship with one of the gaseous streams and in countercurrent relationship with the other of the gaseous streams. In heat exchange applications, heat transfer between the streams of gaseous media is provided as a function of the flow rate of the particulate material and the relative flow rates of the streams of gaseous media.

58 Claims, 22 Drawing Figures

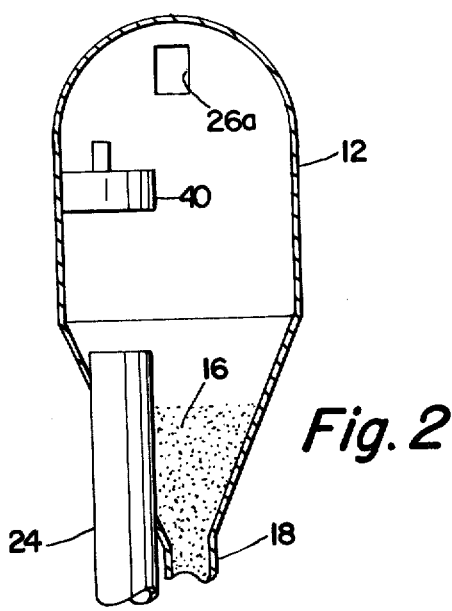
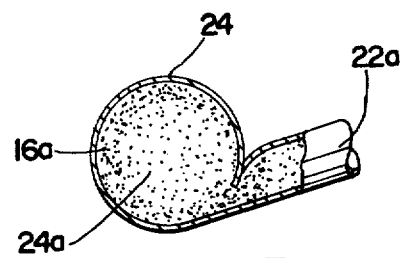
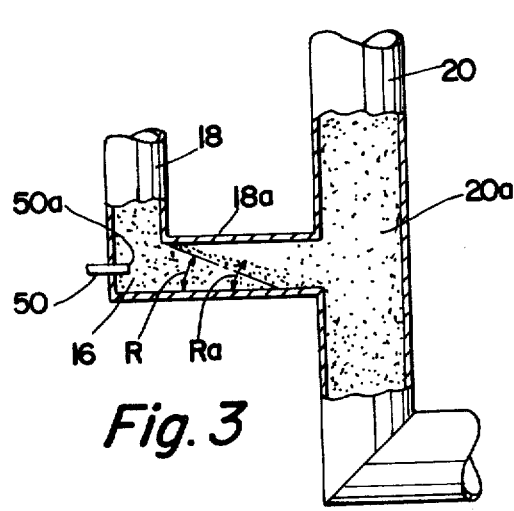
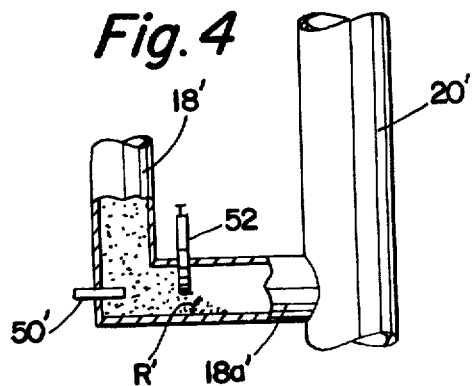
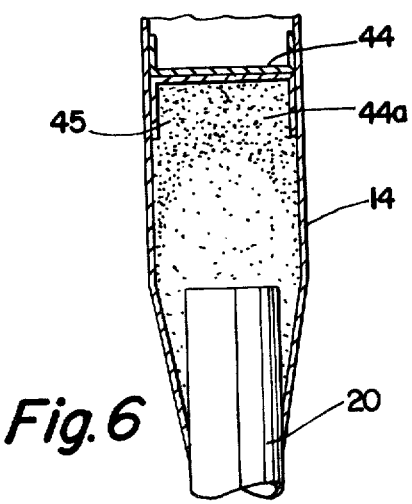
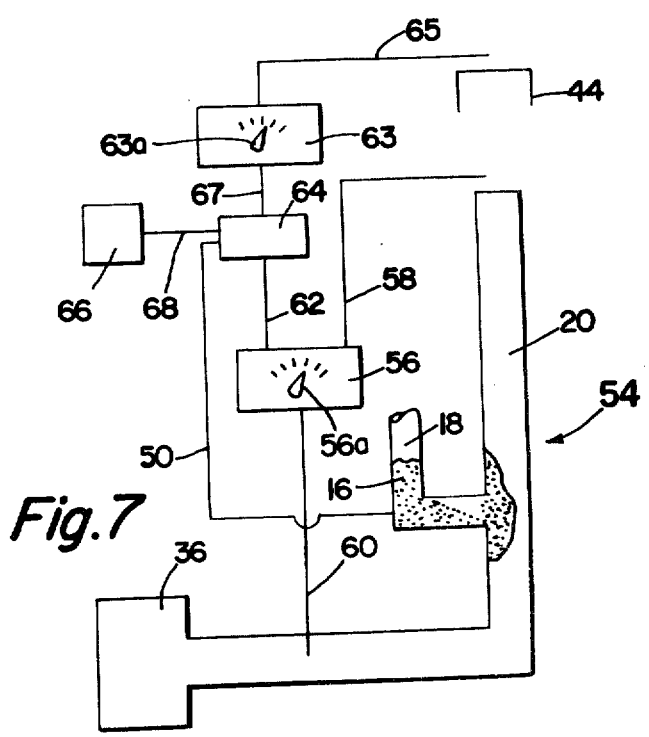

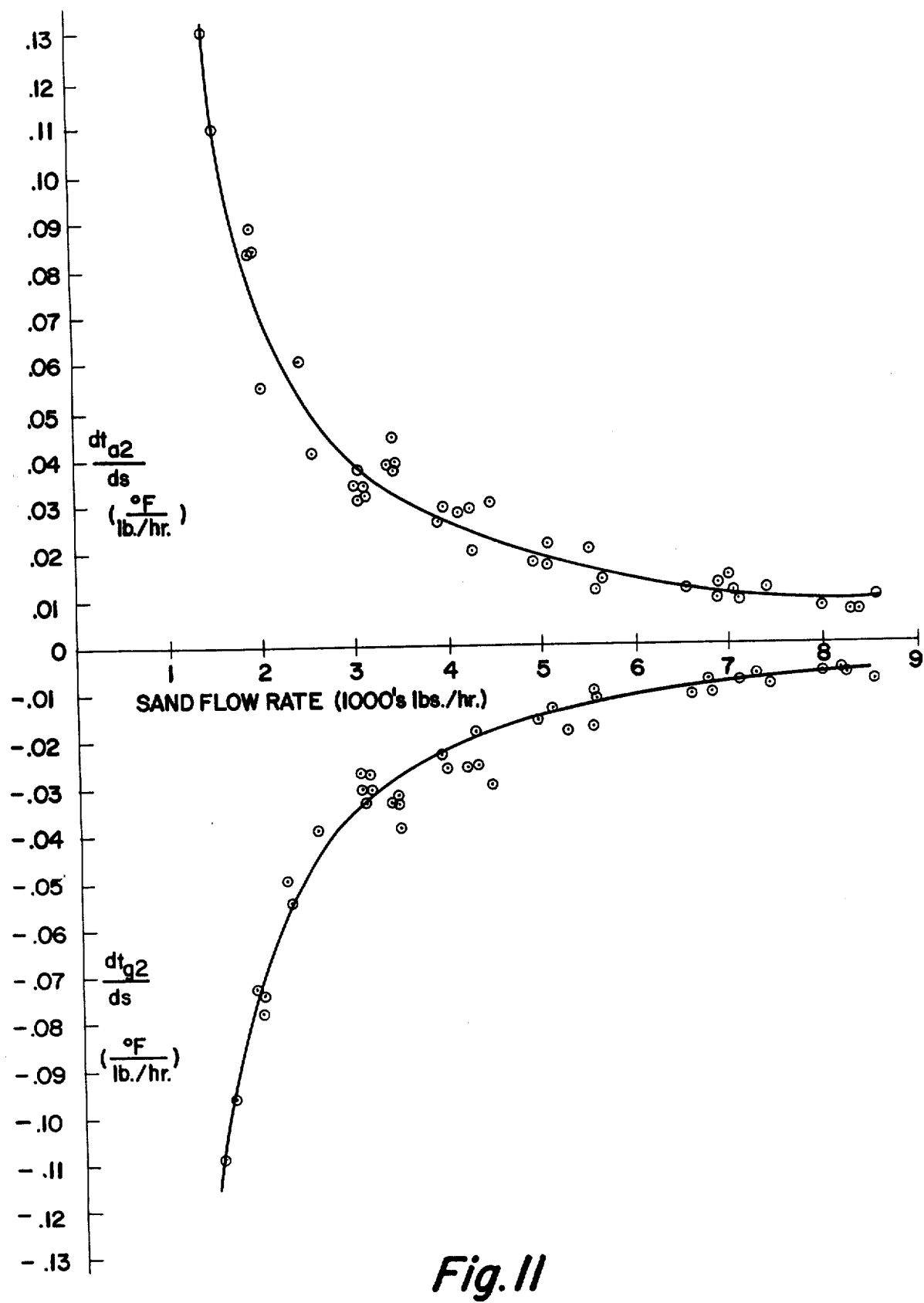
Fig. II

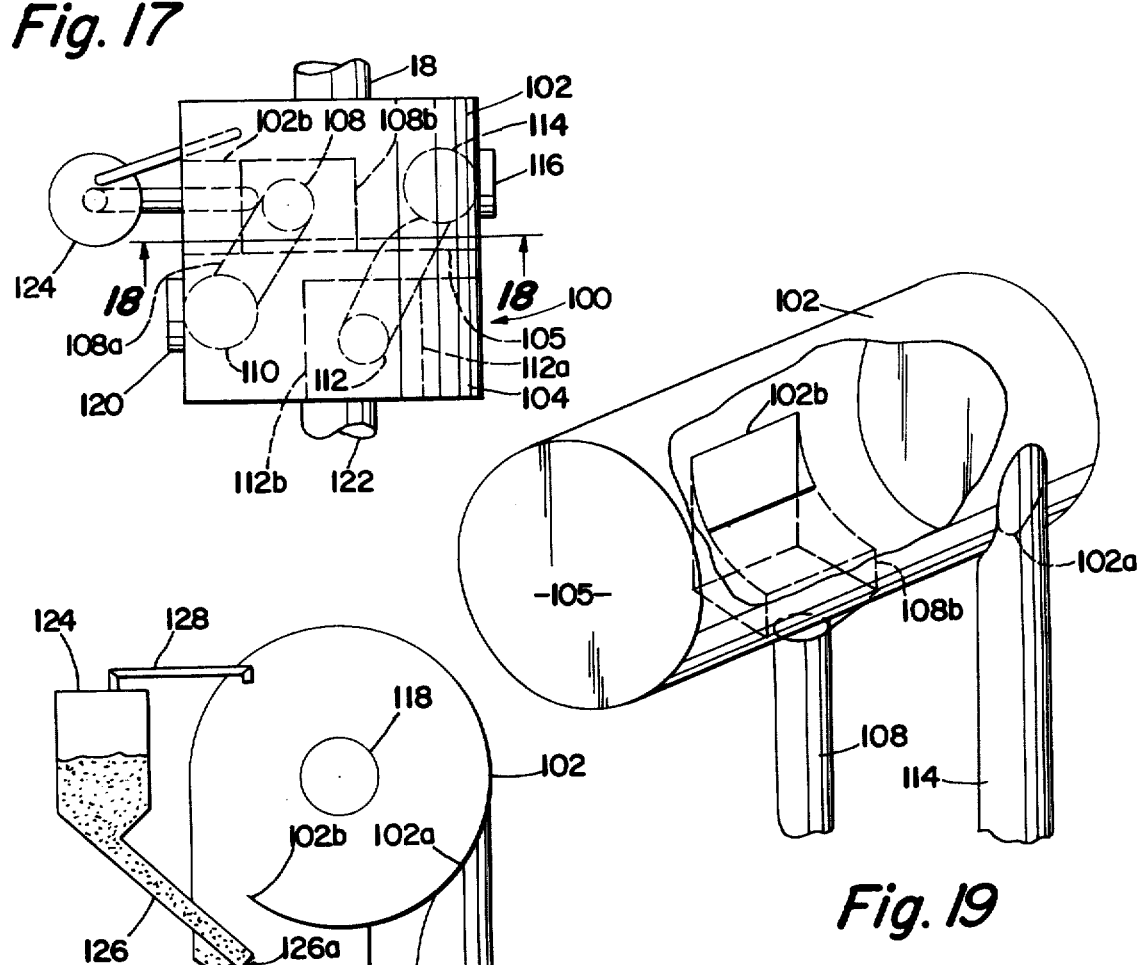
Fig. 17
Fig. 19
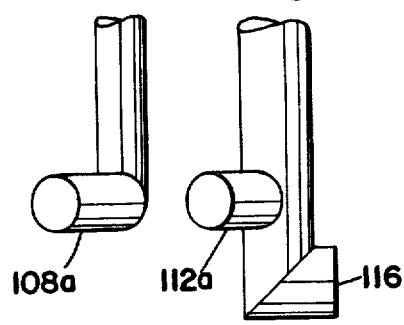
Fig. 18

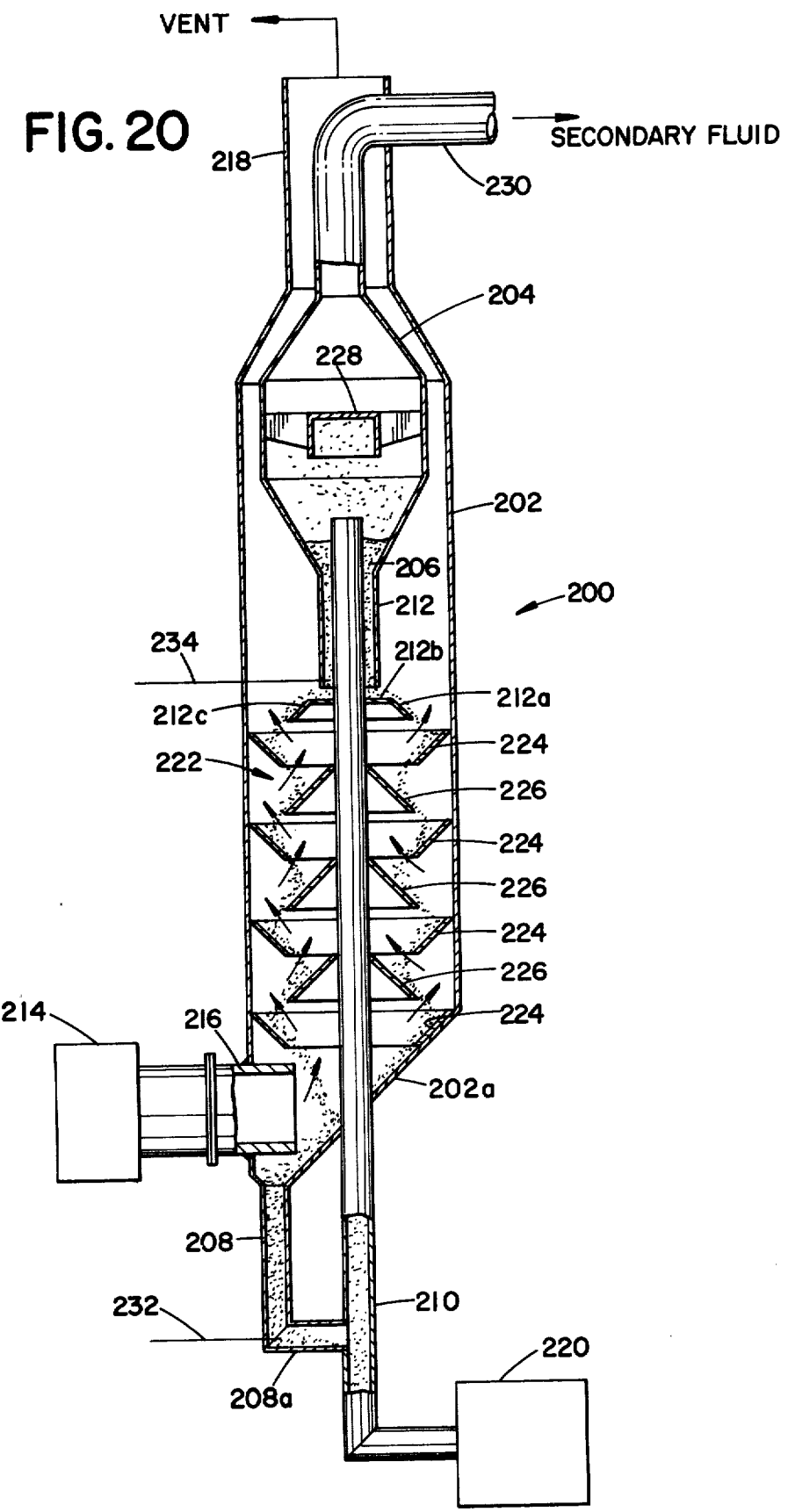

PNEUMATIC TRANSPORT AND HEAT EXCHANGE SYSTEMS

This application is a continuation-in-part of Ser. No. 942,677, filed Sept. 15, 1978, now abandoned.

BACKGROUND OF THE INVENTION AND PRIOR ART

The present invention generally relates to gas-solids transport techniques and heat exchange techniques wherein a solid particulate material suitably sized for pneumatic conveyance is transported or circulated for selective contact and/or direct heat exchange with fluid or gaseous media. Loose packed bed flow and pneumatic conveyance, together with the force of gravity, are employed to transport the particulate material. The transport and heat exchange techniques are particularly useful for recovering heat from high temperature process gases such as flue gas and, in preferred heat exchange systems, the particulate material is circulated in a "figure 8" or a circular "zero loop" flow path or pattern and heat transfer between separate streams of gaseous media is provided as the particulate material contacts one gaseous stream and then the other. The gaseous streams are maintained separate by means of loose packed bed columns of particulate material formed in the flow path and used to introduce the particulate material into the gaseous streams.

The catalytic cracking of hydrocarbons has resulted in a number of prior art gas-solids transport techniques wherein the solid comprises a particulate catalyst which is circulated between a reactor cycle and a regenerator cycle in a figure 8 flow pattern. In addition to hydrocarbon cracking, similar gas-solids transport systems are employed for other chemical processes. The control of particulate material flow in such prior art systems generally include regulation of the gravity withdrawal of the particulate material through standpipes or downcomers with the use of mechanical valves. The prior art also discloses the monitoring of pressure differentials across light and dense phases of fluidized beds for feed purposes and across valves for purposes of regulating the flow of particulate material therethrough.

The subject gas-solids transport techniques are well illustrated in the disclosed heat exchange systems, methods and apparatuses hereinafter described in detail. The heat exchange systems have been found especially advantageous in severe temperature and environment applications such as the recovery of heat from flue gases at temperatures substantially higher than 1000° F. In such severe applications, the prior art heat recovery systems are substantially limited to heat wheels, regenerative devices characterized by brick arrangements, and pebble devices. These prior art devices are not of particular concern herein, and they essentially represent different classes of heat exchangers and heat exchanger techniques characterized by substantial capital investments and space requirements.

SUMMARY OF THE INVENTION

As previously indicated, the present invention contemplates gas-solids transport and heat exchange techniques wherein the solid particulate material is transported by means of pneumatic conveyance and loose packed bed flow. The particulate material is conveyed through substantially unobstructed passageways or conduits, and the flow rate of the particulate material is regulated to obtain optimized transport and/or heat exchange conditions during pneumatic conveyance and loose packed bed flow. The transport and heat exchange systems embodying the disclosed techniques readily lend themselves to automatic control and enable preselection of system operating characteristics.

In accordance with the subject invention, the particulate material is circulated in a continuous flow path or pattern and flows or streams of gaseous media are established at spaced locations in the flow path for direct contact and/-or heat exchange with the particulate material. Loose packed bed columns of particulate material are formed in the flow path for providing dynamic seals between the streams of gaseous media and for introducing the particulate material into the gaseous streams. The particulate material is separated from each gaseous stream following contact therewith and is substantially continuously circulated along the flow path including the gaseous stream contacting portions thereof. The illustrated systems include cocurrent and countercurrent contact with gaseous media.

In the illustrated embodiments wherein the particulate material is circulated in a "figure 8" flow pattern between two vessels, a downcomer is used to withdraw particulate material from an inventory thereof contained within each of the vessels. The particulate material is withdrawn under the influence of gravity and a flowing loose packed bed or bed column of particulate material is formed in a substantially vertical portion of each of the downcomers. Each of the downcomers also includes a laterally extending portion for accumulating the particulate material adjacent the bottom of each of the columns and transferring the particulate material to associated lift lines. The particulate material is pneumatically conveyed to one of the vessels by a first gaseous stream flowing through one of the lift lines and to the other of the vessels by a second gaseous stream flowing through the other of the lift lines. The particulate material is separated from the gaseous streams following pneumatic conveyance and respectively collected in the inventories of particulate material contained within the vessels.

In the illustrated embodiment wherein the particulate material is circulated in a circular or "zero loop" flow path between two vessels, downcomers of a slightly modified structure and loose packed bed columns are again used to withdraw particulate material from flowing inventories thereof maintained in the vessels. In this instance, one of the downcomers is arranged to deliver particulate material into an upper region of one of the vessels for downward flow thereof due to the force of gravity and countercurrent contact with a first gaseous stream flowing upwardly through the vessel. Following contact with the first gaseous stream, the particulate material is withdrawn from a lower region of the vessel through the other downcomer and transferred to a lift line for cocurrent contact with a second gaseous stream as it is pneumatically conveyed to the upper region of the other one of the vessels.

The bulk density of the flowing column or bed of particulate material is controlled or maintained to prevent the net leakage of gaseous media through the downcomers as well as the flow of particulate material due solely to the force of gravity and any difference of the gas pressures at opposite ends of the downcomer. The downcomers are arranged so that the particulate material may be biased to directly spill into the associated lift lines or gaseous streams by a minimal disturbance of the particulate material from its angle of repose adjacent the bottom of each of the downcomers.

In the pneumatic conveyance of the particulate material, the pressure drop of the gaseous conveying medium has been found to be sufficiently closely related to the relative amount of particulate material being conveyed to warrant the use of pressure drop as a control parameter for regulating the flow of particulate material. Accordingly, preferred systems include regulation of the withdrawal of particulate material through at least one downcomer as a function of the pressure drop across its associated lift line. In addition to pressure drop, other sensed operating variables such as outlet temperatures may be used for control or combined with pressure drop regulation to provide a combined parameter control system.

In heat exchange applications wherein heat is to be transferred from a primary fluid or heat providing gaseous stream to a secondary fluid or heat receiving gaseous stream, the primary and secondary streams are each used to pneumatically convey the particulate material through one of the lift lines to its associated operating vessel in figure 8 systems. In zero loop systems, the particulate material flows downwardly through the primary gaseous stream while undergoing countercurrent heat transfer therewith and the secondary gaseous stream is used to pneumatically convey the particulate material through the lift line while undergoing cocurrent heat transfer therewith. In each system, cocurrent heat transfer between the particulate material and the gaseous stream is substantially completed during its pneumatic conveyance by the gaseous stream.

The particulate material provides a heat exchange surface of variable area which can be varied internally with respect to the heat exchanger system by modulation of the flow rate of the particulate material or the weight ratio of solids to gaseous medium. Upon modulation of the flow rate, corresponding changes occur in the inventories of particulate material in the vessels since the total amount of particulate material is constant. Accordingly, the particulate material flow rate may be modulated to vary the quantity of heat transferred and the outlet temperature of the secondary fluid. If the pressure drop of the system to which the heat exchanger is applied is a limiting parameter, the heat exchanger may be operated at a constant total system pressure drop with automatic variation of the flow rate of particulate material. The weight ratio of the flow rate of the secondary fluid to the primary fluid can also be varied to provide a desired outlet temperature or quantity of heat transfer.

It has also been discovered in heat exchange applications that the rate of heat transfer can be maximized as a direct function of the slip velocity or velocity difference between the gaseous medium and particulate material during pneumatic conveyance. Accordingly, the particulate material is caused to violently mix with the gaseous stream during pneumatic conveyance to maximize the slip velocity in preferred heat exchange systems. The violent mixing can be localized at one or more locations as the particulate material is being pneumatically conveyed with corresponding increases in the rate of heat transfer.

The maximization of the rate of heat transfer by means of slip velocity maximization enables the heat exchanger to be optimally sized for a preselected level of heat exchange with minimization of the heat exchange surface area or solids flow rate and system pressure drop. Further, the gas-solids transport techniques are employed to maximize the efficiency of the exchanger system as a whole by minimizing system pressure drops other than those desired during pneumatic conveyance to enhance the velocity difference between the particulate material and the gaseous stream.

In contrast with the prior art, the subject gassolids transport systems enable controllable steady state operation in a functionally and structurally efficient manner. The gravity withdrawal of particulate material through the downcomer in a loose packed bed of controlled density provides an effective dynamic seal against gas pressure biased bulk leakage of the gaseous media which accommodates variations in the selected operating parameters of the system as well as externally imposed operating fluctuations. The accumulations of particulate material in the lateral transfer portions of the downcomers functionally provide a gravity feed-lock system which enables the flow of the particulate material to be controlled without the necessity of conventional valves or similar mechanical flow controllers and actuators therefor. The elimination of valves and other such mechanical devices is also advantageous since it avoids the maintenance problems of such devices as well as the increased pressure drops associated therewith and correspondingly increased power requirements for the system.

In heat exchange applications, the subject systems represent a new class of heat exchangers as compared with presently available commercial devices. In contrast with the relatively large and expensive prior art devices, a 500,000 Btr/hr. heat exchanger figure 8 flow path unit capable of direct recovery of heat from flue gas at temperatures in excess of 1000° F. in accordance with the present invention can be provided with minimum dimensions of about 2 ft.×3 ft.×10 ft. and at a fraction of the cost of prior art devices of comparable capacity and capability. Further, the capacity of the heat exchanger unit may be significantly increased with only modest increases in cost and size.

BRIEF DESCRIPTION OF THE DRAWING

FIG. 2 is a sectional view taken along the line 2—2 in FIG. 1, with parts omitted for clarity of illustration.

FIG. 3 is an elevational view, partially in section and on an enlarged scale, showing the lower portion of a downcomer and its associated lift line;

FIG. 4 is an elevational view similar to FIG. 3 showing a modified downcomer arrangement;

FIG. 5 is a sectional view plan view on an enlarged scale showing the tangential feed of the solid particulate material from a downcomer to an associated lift line;

FIG. 6 is an elevational view, partially in section, showing a lift line and its associated bonnet;

FIG. 7 is a schematic view of a downcomer and associated lift line and a control arrangement for regulating the withdrawal of particulate material through the downcomer as a function of pressure drop across the lift line and/or outlet temperature;

FIG. 11 is a graph illustrating the rates of change or sensitivities of the air and flue gas outlet temperatures with respect to the flow rate of particulate material;

FIG. 17 is a plan view of another embodiment of a heat exchanger having a figure 8 flow path in accordance with the present invention, with parts omitted for clarity of illustration;

FIG. 18 is an elevational view, partially in section, taken along the line 18—18 in FIG. 17;

FIG. 19 is a diagrammatic perspective view showing one side of the heat exchanger of FIG. 17, with parts omitted and broken away, and with the longitudinal dimension expanded for purposes of clarity;

FIG. 20 is an elevational view, partially in section, of another embodiment of a heat exchanger having a zero loop flow path in accordance with the present invention;

DETAILED DESCRIPTION OF THE DRAWINGS

Figure 1:
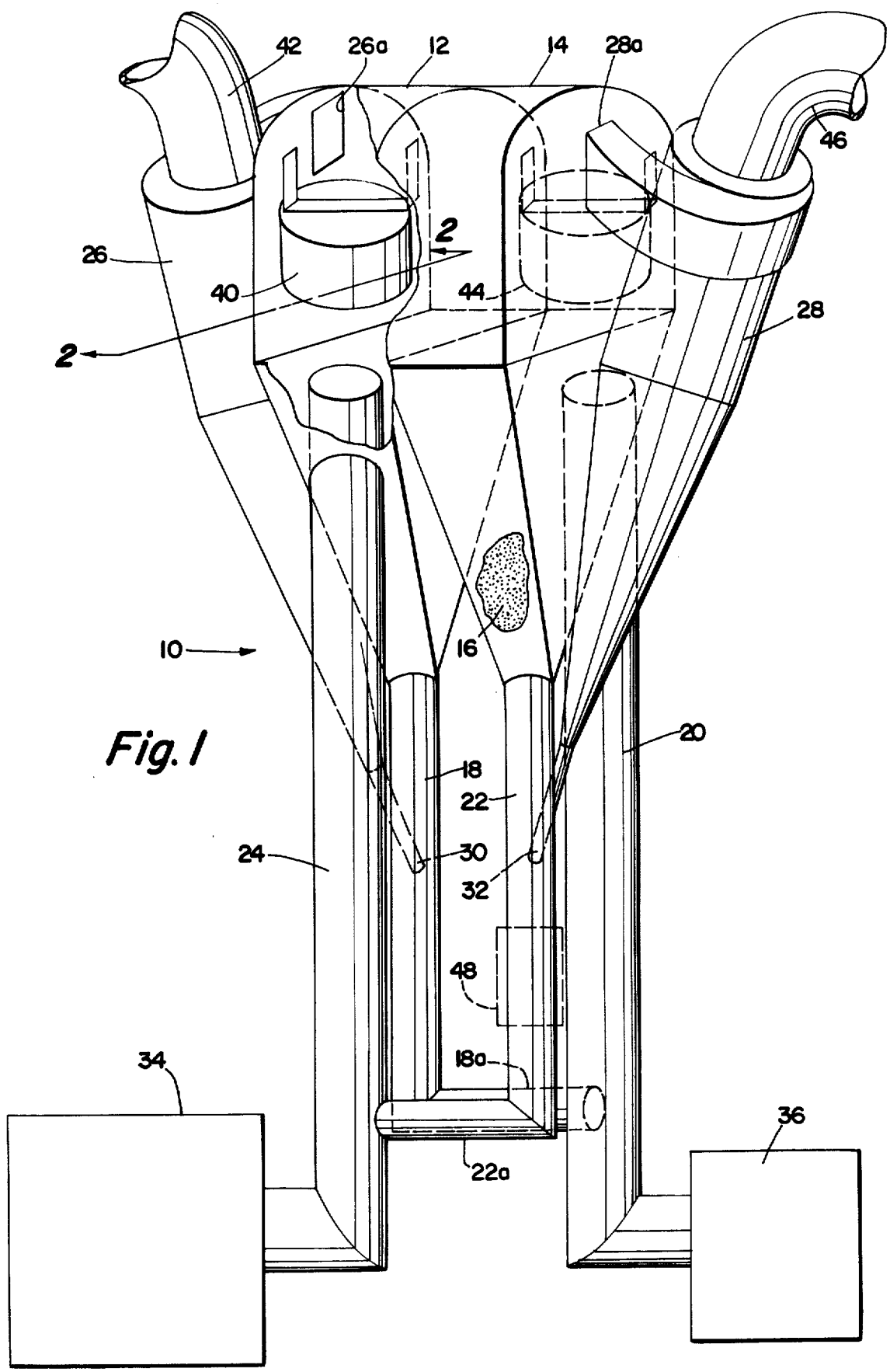
FIG. 1 is a perspective view, partially in section, showing a heat exchanger system having a figure 8 flow path in accordance with the present invention.
Figure 8:
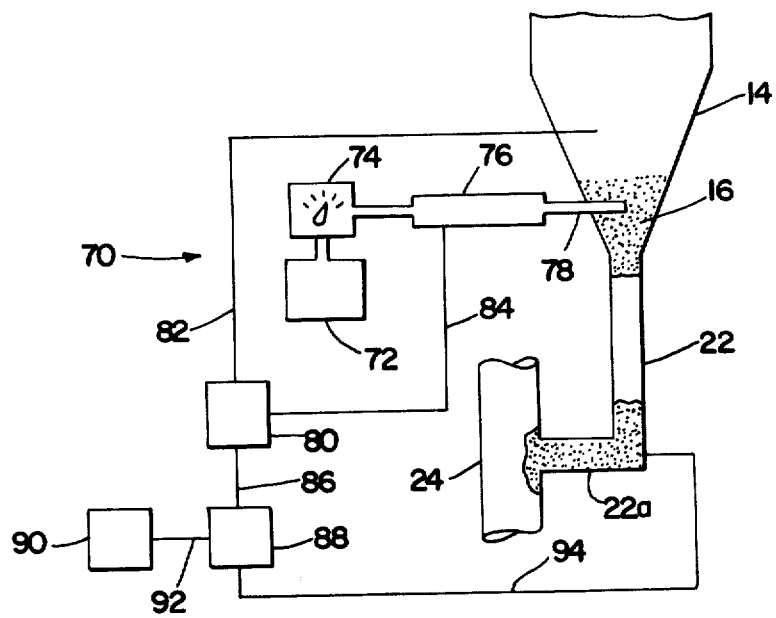
FIG. 8 is a schematic view of a lower portion of an operating vessel, a downcomer for withdrawing particulate material therefrom and its associated lift line, and a control arrangement for regulating the withdrawal of particulate material as a function of the inventory of particulate material above the downcomer.

Referring to FIGS. 1 and 2, a heat exchanger system or unit 10 arranged to employ figure 8 gas-solids transport techniques in accordance with the present invention for recovery of heat from hot flue gases is shown. The heat exchanger 10 includes first and second operating or separation vessels 12 and 14 between which solid particulate material or sand 16 is circulated for purposes of heat transfer with gaseous media.

The particulate material 16 is withdrawn from an inventory thereof maintained within the vessel 12 through a downcomer 18 and pneumatically transferred to the vessel 14 through an associated lift line 20. Similarly, the vessel 14 is provided with a downcomer 22 communicating with an associated lift line 24 for purposes of transporting the particulate material 16 from the vessel 14 to the vessel 12. The vessels 12 and 14 are provided with cyclones 26 and 28 having dip legs 30 and 32 for returning the particulate material separated by the cyclones to the downcomers 18 and 22. The cyclones 26 and 28 may be mounted within the associated vessels 12 and 14.

For purposes of illustration, the heat exchanger 10 is shown applied to a burner-furnace simulator 34 which generates the primary fluid or heat providing stream herein comprising hot flue gases containing sufficient thermal energy to warrant heat recovery. In practice, the simulator 34 may comprise any source of hot process gases such as flue gas potentially containing a wide size range of particulate pollutants. The larger size particles of pollutants will typically be separated from the flue gas by the exchanger 10 and added to the inventory of particulate material. The temperature of the flue gas will generally be greater than about 700° F., and in the range of 1,000° F. to 3000° F. and higher for typical process applications such as those involved in high temperature process industries such as ceramics, glass making, metal melting or forging industries.

The heat exchanger unit 10 is fabricated of a suitable material such as aluminized steel, and the internal surfaces of the unit are free of structural irregularities, such as protruding metal edges or joints, which tend to disturb the smooth flow of the particulate material 16. In cases where particulate material temperatures in excess of 2,000° F. are encountered, refractory linings may be employed at locations of intense heat and wear, such as in the cyclones.

The heat exchanger 10 may be arranged to provide preheated combustion air to the simulator 34 using the heat recovered from the simulator flue gases. To that end, a blower 36 directs the secondary fluid, which comprises ambient air, through the lift line 20 wherein the recovered flue gas heat energy is used to elevate the ambient air temperature to provide the preheated combustion air, which is then returned to the simulator 34 by means of a preheated air return line (not shown). The flow of the primary fluid or flue gases may be maintained or assisted by means of a suction fan (not shown) applied to vessel 12 to assure pneumatic conveyance in the lift line 24. It should be appreciated that the subject heat exchanger is not limited to the provision of preheated combustion air and that the secondary fluid or gaseous stream can be employed in an entirely different process or for other purposes to provide similar cost economies and conservation of energy.

The particulate material 16 comprises Ottawa Sand having a range of specific heats of 0.19 to 0.30 Btu/lb. F and having a particle size in the range of from about 50 to about 420 microns. It should be appreciated that a wide variety of materials are suitable for use as a particulate material in the subject techniques and systems. Typically, any nonsintering, inert, particulate material of suitable size for purposes of pneumatic conveyance, phase separation and forming a loose packed bed column thereof may be employed. In heat exchange applications, it is also desirable that the particulate material have a high specific heat, high hardness, high melting point, and high density. For example, glass beads having a specific gravity of 3.99 and a size in the range from about 100 to about 149 microns have been found satisfactory. In selecting a particulate material, the attrition characteristics of the material itself and its erosion effects with respect to the apparatus are considered parameters.

In the operation of the illustrated system, the sand 16, is withdrawn from the vessel 14 through the downcomer 22 and transferred to the lift line 24 through a laterally, substantially horizontally extending leg portion 22a of the downcomer 22. The hot flue gases from the simulator 34 pass upwardly through the lift line 24, pneumatically conveying with cocurrent heat exchange the relatively cool sand withdrawn from the vessel 14. The gas-solids stream, upon exiting from the lift line 24, impacts against a bonnet 40 which provides initial phase separation with substantial reduction of the velocity of the sand 16 relative to the gaseous medium and a further degree of heat exchange. In the separation of the solid and gaseous phases, the bonnet 40 cooperates with the vessel 12 to provide a settling chamber function, with the relatively hot sand accumulating in the lower inventory portion of the vessel 12.

The cooled flue gases enter the cyclone 26 through a cyclone inlet opening 26a, and any solids remaining in the flue gases are separated therefrom by the cyclone 26 and returned directly to the downcomer 18 through cyclone dip leg 30. The dip leg 30 extends into the downcomer 18 and the flowing loose packed bed of sand therein a sufficient radial distance to avoid wall flow effects and assure the withdrawal of sand from the cyclone 26 through the dip leg and into the established flow region within the loose packed bed. The cooled flue gases are vented from the cyclone through a cyclone outlet and vent 42.

The hot sand 16 is withdrawn from the inventory thereof in the vessel 12 and transferred to the lift line 20 through a horizontally extending leg portion 18a of the downcomer 18. The hot sand is pneumatically conveyed upwardly through the lift line 20 by the ambient air flow provided by the blower 36. The heat transfer process again occurs during pneumatic conveyance, and heat exchange is substantially completed by the time the sand and air exit from the lift line 20.

Upon exiting from the lift line 20, the gas-solids stream is impacted against a bonnet 44 for purposes of phase separation and further heat transfer in a manner similar to that occurring in the vessel 12. Accordingly, the now relatively cool sand 16 is collected in an inventory in the lower portion of the vessel 14 for purposes of recycling back to the vessel 12. The heated ambient air enters the cyclone 28 through a cyclone inlet opening 28a, and any remaining solids are separated and returned directly to the downcomer 22 through the cyclone dip leg 32. The heated ambient air exits from the cyclone 28 through a cyclone outlet and vent 46 which may be connected to a preheated air return line as noted above or directed to a separate process.

The dip leg 32 and downcomer 22 are connected in the same manner as the dip leg 30 and downcomer 18, and similarly assure withdrawal of sand from the cyclone 28. Further, the dip legs 30 and 32 are sealed against reverse flow through the cyclones by the sand in the dip legs and in the respective downcomers during operation of the heat exchanger 10, as well as during the initial start-up of the heat exchanger.

In accordance with the subject gas-solids transport techniques, the sand 16 is withdrawn through the downcomers 18 and 22 in a bed or column under the influence of gravity and any pressure differences of the gases at the opposite ends of the downcomers. As used herein, the term "loose packed bed" or "loose packed bed column" contemplates a range of conditions which can be established in particulate material under the influence of gravity wherein the void volume of the solids may be in the range of 30% to 40%.

In the operation of the heat exchanger system 10, either of the downcomers 18 or 22 may be exposed to varying levels of aeration as a result of operating pressure differentials. For example, the inlet opening at the top of the downcomer 18 within the vessel 12 is essentially exposed to atmospheric pressure in the embodiment of FIG. 1, since the flue gas is directly vented, and the outlet opening adjacent the end of the leg portion 18a of the downcomer 18 is exposed to the pressure in the lift line 20, which may be on the order of 2 psig. Accordingly, the downcomer 18 is exposed to a back pressure of 2 psig and corresponding levels of aeration.

The secondary fluid or gaseous medium in the lift line 20 tends to seep upwardly through the sand 16 in the downcomer 18 under the 2 psig driving force, and a corresponding pressure head is developed in the column of sand to effectively cancel out the 2 psig back pressure and leave only the forces of gravity unbalanced and acting on the sand. Thus, the downcomer is provided with sufficient height and designed to enable the column of sand therein when acted upon by gravity to develop a pressure head at least equal to the difference of the gas pressures at opposite ends of the downcomer in the contemplated system. In this regard, the density of the specific particulate material must be considered and optimization of design should reflect a substantially vertical orientation of the downcomer, since inclination of the downcomer will reduce the potential pressure head which can be developed. Further, the column of particulate material formed by the downcomer should be of substantially uniform vertical configuration, since irregular shapes will also tend to reduce the maximum potential pressure head.

In addition to the foregoing downcomer considerations to accommodate operating pressure differentials, the downcomer is also designed to assure that the flow rates of particulate material therethrough are greater than the rate of the upward seepage of gases. In the illustrated Ottawa Sand system, the gas seepage rate through a loosely packed bed is about 0.01 ft./sec. and, accordingly, the heat exchanger system 10 is designed to assure sand flow rates on the order of about 0.2 ft./sec., or greater.

The foregoing discussion has been primarily concerned with the situation wherein the pressure differential tends to cause gas leakage in a direction opposite to that of the flow of the sand through the downcomer. In some applications, the pressure differential tends to cause gas flow through the downcomer in the same direction as the particulate material flow. For example, the downcomer 22 may be exposed to a back pressure which causes gas flow therethrough in the same direction as the flow of the sand. In this instance, the density of the loose packed bed column within the downcomer 22 must be controlled in order to assure that the sand 16 does not flow into the lift line 24 solely as a result of the forces of gravity and the back pressure, as well as to prevent the direct cross leakage of secondary fluid through the downcomer and into the operating vessel 12 through the lift line 24. To that end, the downcomer 22 and the loose packed bed column of sand therein may be provided with a sufficient height to assure a cancelling pressure drop effect or, alternatively, an enlarged diameter portion 48 as shown in phantom outline in FIG. 1 may be provided to increase the density of the bed by decreasing the sand flow rate through the enlarged portion 48. Accordingly, this downcomer is also designed to assure that gravity comprises the only unbalanced force acting to withdraw sand from the operating vessel 14 and to assure that no direct cross leakage of gas occurs.

A relatively low level of entrainment of fluids or gaseous media by the sand so as to result in the cross flow of flue gas and air to opposite sides of the exchanger has been found in the normal range of operation of the heat exchanger 10. The bulk density of the sand within the downcomers at typical air, flue gas and sand flow rates will result in about a 0.02 mol % crossover flow between the sides of the exchanger at atmospheric pressure. Accordingly, the loose packed beds in the downcomers provide effective dynamic seals with respect to fluid entrainment as well as bulk leakage tending to result from operating pressure differences.

As indicated above, the sand 16 is withdrawn from the vessels 12 and 14 through the downcomers 18 and 22 under the influence of gravity and in a gravity feed-lock system. More particularly, the sand accumulates in each of the leg portions 18a and 22a, assuming natural angles of repose reflecting the pressure differentials applied to the downcomers, and it does not flow into the associated lift lines 20,24 in the absence of positive feed bias. The accumulation of sand is shown with reference to the downcomer 18 in FIG. 3, it being understood that the same accumulation condition occurs in the downcomer 22.

As shown in FIG. 3, the sand 16 accumulates in the leg portion 18a of the downcomer 18 and assumes a natural angle of repose R in the absence of positive feed bias. The length of the horizontal leg portion 18a is just long enough to prevent spillover or weeping of the sand into the lift line 20 solely due to the forces of gravity and the operating pressure differentials imposed upon the downcomer 18. A positive feed bias is obtained by disturbing the sand from its natural angle of repose R by the controlled flow of an inert gas, such as trigger air introduced through line 50, to cause the sand to assume an operating feed angle Ra and directly spillover into the lift line 20. In this manner, a gravity feed-lock system is provided, and the withdrawal and feeding of the sand are achieved with a minimum power requirement and without the use of valves and actuators therefor.

The required length of the leg portion 18a of the downcomer will vary as a function of the characteristics of the particulate material, the specific configuration and orientation of the leg portion, and the operating pressure differentials of the system. In order to accommodate system variations and to avoid undesirably long leg portions, the cross sectional area of the leg portion can be reduced per se or effectively reduced by the use of an adjustable weir 52, as shown in the embodiment of FIG. 4. For purposes of convenience, the elements of FIG. 4 are identified with the corresponding reference numerals used in FIG. 3 and the addition of a prime designation. The weir 52 is arranged for radial movement through the leg portion 18a' to adjustably reduce the cross sectional area of the leg portion and cause the accumulation of sand to terminate in its natural angle of repose R' with a reduced horizontal dimension or lateral extent. As shown in FIG. 4, the angle of repose R' is substantially equal to the angle R, but the weir 52 causes the accumulation of sand to terminate in a shorter horizontal distance.

As discussed in greater detail below, the particulate material or sand 16 withdrawn through each of the downcomers is transferred to the associated lift lines and introduced therein to maximize the velocity difference between the particulate material and the gaseous conveying stream. In addition, it has been found advantageous to tangentially introduce the sand 16 into the lift line 24 for pneumatic transfer and convenyance by the hot flue gases. As shown in FIG. 5, the tangential introduction of the sand 16 causes it to sweep about the inside periphery of the lift line 24 to form a heat insulating layer of sand 16a which tends to structurally protect the lift line from the extremely high flue gas temperatures in a mixing zone 24a adjacent the outlet of the leg portion 22a. In the lift line 20, radial introduction of the sand 16 as shown in FIG. 3 has been found satisfactory and to provide a mixing zone 20a adjacent the outlet of the leg portion 18a.

As the sand enters the lift lines and the mixing zones 20a and 24a, it initially falls downwardly a short distance as it is violently mixed with the pneumatic conveying fluid. The violent mixing of the sand with the air in the mixing zone 20a is described below in detail with reference to FIG. 3, it being understood that similar violent mixing occurs in the mixing zone 24a with the addition of the heat insulating layer 16a resulting from tangentially introducing the sand.

Referring to FIG. 3, the sand 16 is biased from its natural angle of repose in the leg portion 18a and into the lift line 20 at the beginning of the pneumatic conveyance step. The sand initially clouds and falls or floats downward in the mixing zone 20a. The direction of the sand flow is then reversed by the gaseous conveying medium, and the sand is rapidly accelerated, with turbulent flow conditions prevailing as the sand particles are swept upwardly in a slipstream fashion. The violent mixing of the particulate material with the gaseous stream is characterized by turbulent flow conditions including random movement and repeated acceleration and deceleration of the sand appearing to result from eddies and interparticle collisions within the gaseous stream. In accordance with visual observations, the mixing zone 20a extends within the lift line for a distance of several feet, depending upon the weight ratio of sand to gaseous medium and the velocity of the gaseous medium.

The flow conditions in the mixing zone 20a have been found to maximize the rate of heat transfer between the sand and gaseous medium. The maximization of the rate of heat transfer is associated with relatively high slip velocities existing in the zone 20a and reflects large increases in the coefficient of heat transfer.

The coefficient of heat transfer is again maximized at the end of the pneumatic conveyance steps by directing the sand and gaseous stream exiting from each of the lift lines 20 and 24 into the associated bonnets 44 and 40 to provide further violent mixing. This is illustrated in FIG. 6 for the lift line 20 and bonnet 44 where a mixing zone 44a is shown, it being appreciated that a similar mixing zone 40a (not shown) is provided with respect to the lift line 24 and bonnet 40.

The mixing zone 44a is formed adjacent a downwardly opening chamber 45 defined by the bonnet 44. A dense cloud of sand-gaseous medium is believed to be continuously entrapped within the chamber 45 and to protect the bonnet from erosion and to substantially decelerate the sand particles parimarily as a result of interparticle collisions. The flow conditions within mixing zone 44a have been found to maximize the coefficient of heat transfer in a manner similar to that in the mixing zone 20a.

Referring to FIG. 7, an automatic feed control arrangement 54 for purposes of regulating the withdrawal of sand 16 through the downcomer 18 as a function of the pressure drop in the associated lift line 20 is illustrated. A differential pressure sensor 56 is connected across the lift line 20 by means of lines 58 and 60 to respectively measure the pressure of the secondary fluid prior to the introduction of sand and at the exit of the lift line in order to determine the pressure drop through the lift line. The sensor 56 is connected by line 62 to a flow control valve 64, which in turn is connected to a trigger air source 66 by line 68. If the sensed pressure drop across the lift line 20 is lower than a preselected value, the flow control valve 64 is actuated to provide increased trigger air through the line 50.

The trigger air is introduced into the accumulated sand 16 adjacent the lower portion of the downcomer 18 through a nozzle 50a (FIG. 3) to bias the accumulated sand from its natural angle of repose in the leg portion 18a and into the lift line 20 for pneumatic conveyance and heat exchange. If the sensed pressure drop is greater than the preselected value, the flow control valve 64 closes somewhat to reduce the flow of trigger air and the sand will assume a substantially slower flow rate in the downcomer 18. For purposes of adjusting the pressure drop, the sensor 56 includes a set point control knob 56a.

In the control arrangement 54, the monitored pressure drop is across the lift line 20 and advantageously enables prevention of sand flow rates corresponding to the choking velocity in the lift line 20 under the particular operating conditions. However, any operating pressure drop can be monitored, including, for example, combined pressure drops through the lift line 20, the cyclone 28, and a downstream process in which the secondary fluid is employed. It is advantageous to include the pressure drop in the lift line 20 in the monitored pressure drop, since it represents the largest pressure drop in the heat exchanger system 10 and readily enables avoidance of choking velocities.

The withdrawal of sand 16 through the downcomer 18 may also be regulated as a function of the outlet temperature of the secondary fluid or a temperature of the system to which the exchanger is applied. Accordingly, the feed control arrangement 54 may be modified by the substitution of a temperature sensor 63 for the differential pressure sensor 56 or the two sensors 56,63 may be employed in a combined system, as discussed below in detail.

The temperature sensor 63 is arranged to monitor the secondary fluid outlet temperature at a location downstream of the lift line 20 by means of line 65 and to transmit an outlet temperature control signal through line 67 to the flow control valve 64. The outlet temperature is directly related to the sand flow rate, and the flow control valve 64 is temperature modulated to provide a corresponding level of trigger air bias to the accumulated sand 16 in the leg portion 18a in accordance with the difference between the sensed outlet temperature and the desired temperature as set by adjustment of a control knob 63a.

As indicated above, it is also convenient to combine the temperature and pressure controls in a system wherein the temperature sensor 63 is arranged to control the flow rate of the sand in accordance with a sensed outlet temperature, and the pressure sensor 56 is set to operate at a sand flow rate below the choking velocity under the operating conditions in the lift line 20. Thus, the combined system is essentially temperature controlled, with pressure drop regulation governing only to prevent choking in the lift line.

On the opposite side of the heat exchanger system 10, the withdrawal of the sand 16 from the vessel 14 through the downcomer 22 is controlled in a following manner relative to the sand flow rate resulting from the preselected pressure drop and/or outlet temperature as discussed above. More particularly, an automatic level control arrangement 70, shown in FIG. 8, maintains a constant inventory of sand 16 in the vessel 14 above the inlet opening of the downcomer 22. Accordingly, the sand flow rate through the downcomer 22 will be about equal to the sand flow rate through the downcomer 18, since the total amount of sand in the system is substantially constant.

In the control arrangement 70, an air supply source 72 and a regulator 74 are used to introduce a constant gas flow into the vessel 14 at the desired level of the inventory of sand 16 through a line 76 and a restricted nozzle 78. The gas pressure in the line 76 is compared with the gas pressure in the vessel 14 by means of a differential pressure sensor 80 connected therebetween by means of lines 82 and 84. The sensor 80 is connected by line 86 to a flow control valve 88. In accordance with the sensed pressure differential, the valve 88 is actuated to provide trigger air from a trigger air source 90, which is connected to the valve 88 by a line 92, to the downcomer 22 through a line 94 to bias the accumulated particulate material into the lift line 24.

In the operation of the level control arrangement 70, if the level of the inventory of sand 16 is below the level of the nozzle 78, a relatively small pressure drop will be sensed by the differential pressure sensor 80, and the flow control valve 88 will be closed to stop the flow of trigger air and the withdrawal of sand. The sand 16 will then accumulate in the downcomer 22 and vessel 14 until it reaches the desired inventory level and covers the nozzle 78. When the nozzle 78 is covered with sand, the sensed pressure differential will increase, and the flow control valve 88 will be actuated to cause the flow of trigger air through the line 94 to bias the accumulated sand 16 from its natural angle of repose in the leg portion 22a into the lift line 24.

It should be appreciated that the control arrangements 54 and 70 can be applied to the opposite sides of the heat exchanger system 10. More particularly, the control arrangement 54 may be used to regulate the rates of withdrawal of sand through the downcomer 22 from the vessel 14, and the control arrangement 70 may be used to regulate the inventory of sand in the vessel 12.

Figure 9:
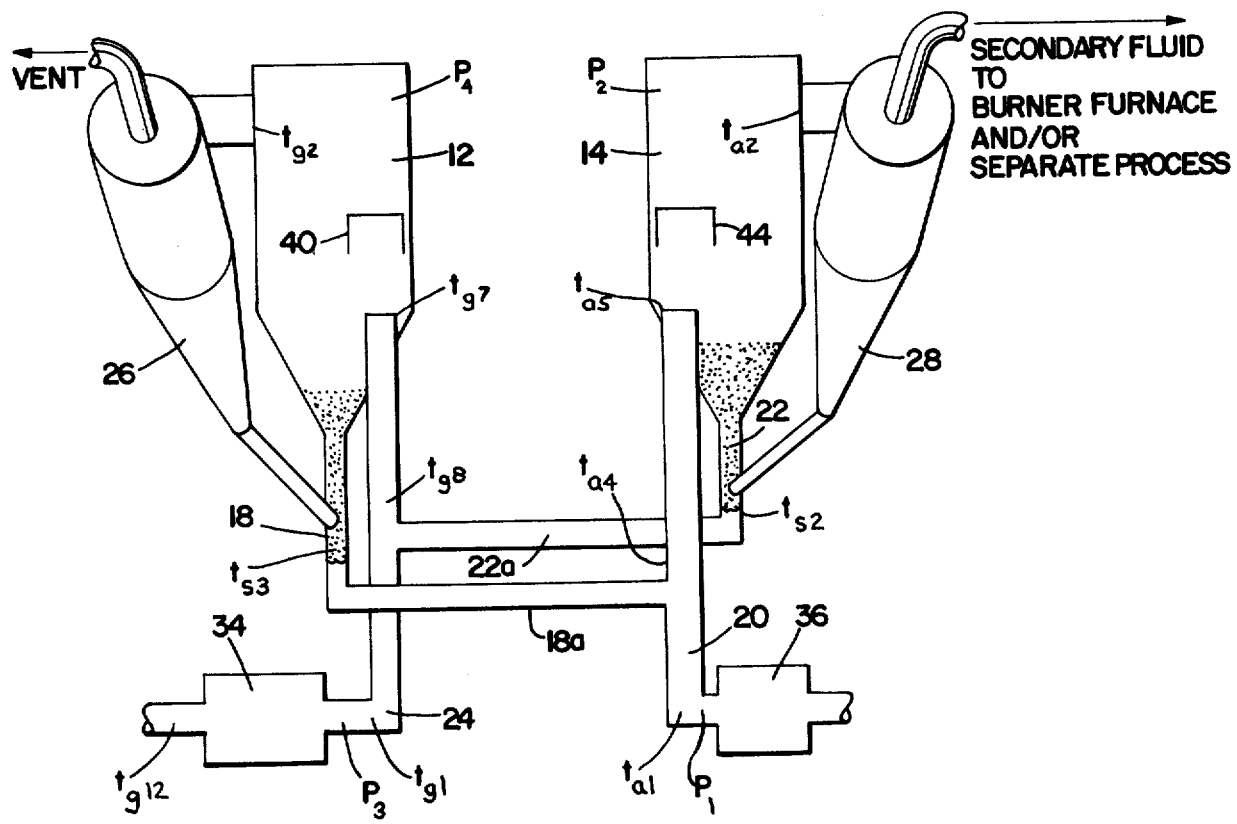
FIG. 9 is a diagrammatic view of the apparatus shown in FIG. 1 illustrating the location of sensed temperature and pressure operating variables.

Referring to FIG. 9, the heat exchanger system 10 is diagrammatically shown for purposes of illustrating various temperature and pressure measurements used in the subsequent explanation of the system. As indicated in FIG. 9, the secondary fluid may be fed to the simulator 34 when the system is operated in a coupled mode, or the secondary fluid may be directed to a separate and different process, such as, a reactor system or a simple space heater application. Further, a portion of the heated secondary fluid may be returned to the simulator 34 as preheated combustion air, and the remaining portion of the secondary fluid may be used in a separate process. The temperature and pressure measurements are itemized below, and the notation employed in the subsequent analysis of data is summarized thereafter. In the following discussion and tables, all temperatures are in degrees Fahrenheit and pressures in millimeters of water unless otherwise indicated.

Temperature Measurements $t_{a1}$—Secondary fluid or air inlet temperature to heat exchanger.

$t_{a4}$—Temperature of secondary fluid in lift line 20 at a distance of about 2 feet above the outlet of leg portion 18a.

$t_{a5}$—Temperature of secondary fluid in lift line 20 at a distance of about 7 feet above the outlet of leg portion 18a.

$t_{a2}$—Secondary fluid outlet temperature as it leaves vessel 14.

$t_{g1}$—Primary fluid or flue gas inlet temperature.

$t_{g8}$—Temperature of primary fluid in lift line 24 at a distance of about 2 feet above the outlet of leg portion 22a.

$t_{g7}$—Temperature of primary fluid in lift line 24, at a distance of about 7 feet above the outlet of leg portion 22a.

$t_{g2}$—Primary fluid outlet temperature as it leaves vessel 12.

$t_{g12}$—Simulator combustion air inlet temperature.

$t_{s2}$—Temperature of sand into lift line 24.

$t_{s3}$—Temperature of sand into lift line 20.

Pressure Measurements $P_1$—Pressure of secondary fluid or air into lift line 20.
$P_2$—Pressure of secondary fluid as it leaves vessel 14.
$P_3$—Pressure of primary fluid or flue gas into lift line 24.
$P_4$—Pressure of primary fluid as it leaves vessel 12.
$\Delta Pa$—Pressure drop across lift line 20.
$\Delta Pg$—Pressure drop across lift line 24.

Calculated Values a—Flow rate of secondary fluid or air through lift line 20 in lbs./hr.

g—Flow rate of primary fluid or flue gas through lift line 24 in lbs./hr.

s—Flow rate of solid particulate material or sand in lbs./hr.

Qa—Heat absorbed by secondary fluid in Btu/hr.
Qg—Heat lost by primary fluid in Btu/hr.

$$\alpha_a = \frac{sc_s}{ac_a} = \frac{\text{Thermal mass of particulate material}}{\text{Thermal mass of secondary fluid}}$$

Alpha a, the weight ratio of the sand flow rate s to the secondary fluid or air flow rate a, adjusted by their respective specific heats $c_s$ and $c_a$ for convenience in mathematical expressions of heat transfer relationships, and essentially representing the sand loading of the air stream.

$$\alpha_g = \frac{sc_s}{gc_g} = \frac{\text{Thermal mass of particulate material}}{\text{Thermal mass of primary fluid}}$$

Alpha g, the weight ratio as defined above for $\alpha_a$ but with respect to the primary fluid or flue gas flow rate g.

$$\beta = \frac{ac_a}{gc_g} = \frac{\text{Thermal mass of secondary fluid}}{\text{Thermal mass of primary fluid}}$$

Beta, the weight ratio of the secondary fluid or air flow rate a to the primary fluid or flue gas flow rate g, adjusted by the specific heats as indicated, and essentially representing the weight flow rate ratio of the fluid streams.

Hr The percent heat recovery defined as the percentage obtained by dividing the heat absorbed by the secondary fluid, Qa, by the total amount of heat theoretically available from the primary fluid, assuming that its inlet temperature $t_{g1}$ is reduced to the inlet temperature $t_{a1}$ of the secondary fluid.

Hr* The theoretical percent heat recovery defined as the percentage obtained by dividing the quantity of heat which could be absorbed by the secondary fluid if ideal cocurrent heat exchange occurred by the total amount of heat theoretically available from the primary fluid if it were cooled to the inlet temperature $t_{a1}$.

E The efficiency of the exchanger defined as the percentage obtained by dividing Hr by Hr*, and essentially comprising a comparison of the actual performance of the cocurrent heat exchanger with the maximum theoretical heat recovery possible under conditions of ideal cocurrent heat transfer.

The operation of the heat exchanger 10 in a coupled mode is illustrated by the test runs reported in Table I. In these runs, the secondary fluid was ambient air which was returned to the simulator 34 as preheated combustion air. The Ottawa Sand employed in these runs had a particle size of about 240 microns. The heat exchanger was controlled by monitoring the pressure drop $\Delta Pa$ in the lift line 20 with the automatic feed control arrangements 54 and 70 as described above. In each of the runs, a predetermined pressure drop across the lift line 20 was set and the system was allowed to reach steady state conditions with the achievement of the preselected pressure drop.

The air and flue gas flow rates reported in Table I result in feed velocities to the air lift line 20 in the range of 20 to 30 feet per second and to the flue gas lift line 24 in the range of 80 to 120 feet per second. In the air lift line, the exiting velocity will be about twice the feed velocity due to the increase in temperature of the air and, similarly, the exiting flue gas velocity will be about one-half the feed velocity due to the cooling of the flue gas.

TABLE 1

| Run No. | a | g | s | Δpa | Δpg | $\alpha_a$ | $\alpha_g$ | $\beta$ | Qa[1] | Qg[1] | Hr | Hr* | E |
|---|---|---|---|---|---|---|---|---|---|---|---|---|---|
| 1 | 1888 | 1914 | 7127 | 180 | 240 | 4.40 | 4.00 | 0.91 | 310 | 346 | 0.44 | 0.43 | 1.02 |
| 2 | 1888 | 1906 | 8346 | 200 | 240 | 4.85 | 4.52 | 0.93 | 225 | 252 | 0.41 | 0.44 | 0.94 |
| 3 | 1888 | 1916 | 3455 | 75 | 140 | 2.14 | 1.92 | 0.90 | 291 | 336 | 0.37 | 0.38 | 0.97 |
| 4 | 1888 | 1917 | 7924 | 170 | 220 | 4.75 | 4.35 | 0.92 | 266 | 296 | 0.41 | 0.43 | 0.95 |
| 5 | 1888 | 1910 | 3252 | 60 | 120 | 1.92 | 1.75 | 0.91 | 233 | 265 | 0.36 | 0.38 | 0.96 |
| 6 | 1888 | 1909 | 5723 | 140 | 210 | 3.37 | 3.10 | 0.92 | 252 | 284 | 0.40 | 0.41 | 0.96 |
| 7 | 1888 | 1917 | 3396 | 72 | 140 | 2.10 | 1.88 | 0.90 | 295 | 345 | 0.37 | 0.38 | 0.97 |
| 8 | 1888 | 1916 | 4143 | 80 | 160 | 2.56 | 2.30 | 0.90 | 300 | 352 | 0.37 | 0.39 | 0.95 |

TABLE 1-continued

| Run No. | a | g | s | Δpa | Δpg | $\alpha_a$ | $\alpha_g$ | $\beta$ | Qa[1] | Qg[1] | Hr | Hr* | E |
|---|---|---|---|---|---|---|---|---|---|---|---|---|---|
| 9 | 1888 | 1914 | 7361 | 180 | 220 | 4.53 | 4.10 | 0.91 | 320 | 369 | 0.40 | 0.43 | 0.94 |
| 10 | 1957 | 1985 | 3281 | 70 | 140 | 1.97 | 1.77 | 0.90 | 276 | 322 | 0.36 | 0.42 | 0.84 |
| 11 | 1957 | 1984 | 3925 | 100 | 160 | 2.35 | 2.12 | 0.90 | 296 | 333 | 0.38 | 0.39 | 0.98 |
| 12 | 1957 | 1983 | 6710 | 160 | 240 | 4.00 | 3.63 | 0.91 | 311 | 354 | 0.40 | 0.42 | 0.95 |
| 13 | 1634 | 1655 | 2708 | 98 | 95 | 1.88 | 1.72 | 0.91 | 197 | 230 | 0.35 | 0.37 | 0.95 |
| 14 | 1634 | 1655 | 3058 | 100 | 95 | 2.13 | 1.94 | 0.91 | 201 | 234 | 0.36 | 0.38 | 0.94 |
| 15 | 1634 | 1655 | 4244 | 115 | 120 | 2.94 | 2.69 | 0.91 | 214 | 248 | 0.37 | 0.41 | 0.92 |
| 16 | 1619 | 1638 | 8310 | 240 | 240 | 5.80 | 5.33 | 0.92 | 233 | 266 | 0.41 | 0.44 | 0.93 |
| 17 | 1310 | 1329 | 5728 | 240 | 280 | 4.92 | 4.47 | 0.91 | 209 | 244 | 0.40 | 0.43 | 0.92 |
| 18 | 1310 | 1329 | 3149 | 120 | 120 | 2.81 | 2.54 | 0.91 | 192 | 215 | 0.38 | 0.40 | 0.94 |
| 19 | 1310 | 1330 | 2277 | 80 | 80 | 2.04 | 1.83 | 0.90 | 185 | 216 | 0.35 | 0.38 | 0.94 |
| 20 | 1310 | 1330 | 1774 | 40 | 40 | 1.59 | 1.42 | 0.90 | 175 | 210 | 0.33 | 0.35 | 0.93 |
| 21 | 1573 | 1593 | 3202 | 60 | 100 | 2.35 | 2.14 | 0.91 | 210 | 235 | 0.37 | 0.39 | 0.95 |
| 22 | 1573 | 1598 | 1892 | 30 | 80 | 1.41 | 1.26 | 0.89 | 214 | 249 | 0.33 | 0.34 | 0.95 |
| 23 | 1573 | 1595 | 3781 | 130 | 120 | 2.81 | 2.54 | 0.90 | 230 | 276 | 0.37 | 0.40 | 0.92 |
| 24 | 1573 | 1595 | 7203 | 240 | 240 | 5.33 | 4.84 | 0.91 | 251 | 302 | 0.39 | 0.43 | 0.90 |
| 25 | 1630 | 1662 | 6813 | 240 | 320 | 5.06 | 4.49 | 0.89 | 353 | 394 | 0.41 | 0.43 | 0.97 |
| 26 | 1665 | 1697 | 5182 | 180 | 180 | 3.77 | 3.34 | 0.89 | 348 | 388 | 0.40 | 0.41 | 0.97 |
| 27 | 1665 | 1697 | 4269 | 90 | 140 | 3.12 | 2.75 | 0.88 | 339 | 378 | 0.39 | 0.40 | 0.98 |
| 28 | 1665 | 1697 | 3335 | 65 | 140 | 2.44 | 2.15 | 0.88 | 325 | 365 | 0.38 | 0.38 | 0.98 |
| 29 | 1179 | 1203 | 6785 | 260 | 220 | 6.96 | 6.18 | 0.89 | 259 | 295 | 0.42 | 0.44 | 0.95 |
| 30 | 1179 | 1203 | 5108 | 200 | 180 | 5.25 | 4.66 | 0.89 | 249 | 281 | 0.41 | 0.43 | 0.96 |
| 31 | 1179 | 1203 | 4918 | 180 | 130 | 5.06 | 4.49 | 0.89 | 240 | 281 | 0.40 | 0.43 | 0.93 |
| 32 | 1179 | 1203 | 3151 | 140 | 100 | 3.25 | 2.87 | 0.88 | 231 | 261 | 0.39 | 0.40 | 0.96 |
| 33 | 1179 | 1203 | 2341 | 120 | 85 | 2.42 | 2.13 | 0.88 | 221 | 255 | 0.37 | 0.38 | 0.96 |
| 34 | 1179 | 1203 | 1851 | 100 | 70 | 1.92 | 1.68 | 0.88 | 209 | 245 | 0.35 | 0.37 | 0.96 |
| 35 | 1179 | 1203 | 1624 | 75 | 70 | 1.68 | 1.47 | 0.88 | 203 | 242 | 0.34 | 0.35 | 0.95 |
| 36 | 1179 | 1203 | 1432 | 60 | 55 | 1.49 | 1.30 | 0.87 | 188 | 235 | 0.31 | 0.35 | 0.89 |
| 37 | 1989 | 2025 | 8611 | 230 | 280 | 5.25 | 4.67 | 0.89 | 420 | 461 | 0.42 | 0.43 | 0.97 |
| 38 | 1989 | 2025 | 7070 | 200 | 240 | 4.32 | 3.83 | 0.89 | 410 | 450 | 0.41 | 0.42 | 0.97 |
| 39 | 1989 | 2025 | 5616 | 160 | 180 | 3.44 | 3.05 | 0.89 | 394 | 433 | 0.40 | 0.41 | 0.97 |
| 40 | 1989 | 2027 | 4491 | 150 | 180 | 2.75 | 2.42 | 0.88 | 383 | 452 | 0.37 | 0.41 | 0.97 |

[1]Number reported in thousands

Figure 10:
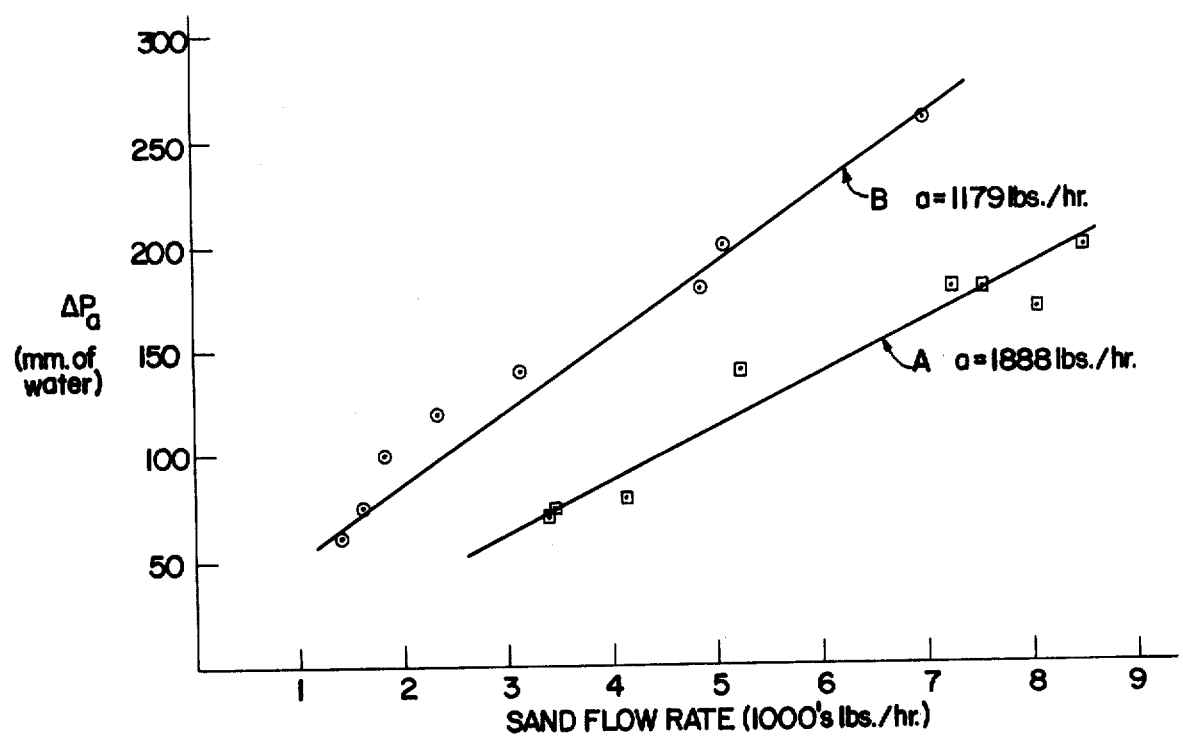
FIG. 10 is a graph illustrating the relationship between pressure drop and the flow of particulate material.

In considering the test runs of Table I, reference is made to curves A and B in FIG. 10 which respectively show the relationship between the pressure drop ΔPa and the sand flow rate for run Nos. 1 to 9 having an air flow rate of 1,888 lbs./hr. and run Nos. 29 to 36 having an air flow rate of 1,179 lbs./hr. As shown in FIG. 10, the pressure drop ΔPa is directly related to the sand flow rate with sufficient sensitivity to enable the later to be controlled by pressure drop regulation, and the pressure drop is inversely related to the absolute value of the air flow rate. The inverse relationship between the pressure drop and the absolute value of the air flow rate effectively relates the pressure drop to the sand loading of the air stream $\alpha_a$ over reasonable ranges of operation of the heat exchanger. Similar relationships between the pressure drop and the sand and flue gas flow rates have been found to occur in the flue gas side of the exchanger, although the pressure drop ΔPg appears to be less sensitive to variations of the absolute value of the flue gas flow rate and sand loading $\alpha_g$. The difference in pressure drop response on each side of the heat exchanger is believed to be primarily associated with the acceleration of the air as it is heated during pneumatic conveyance and the deceleration of the flue gas as it is cooled. However, the inverse relationship is observed in all cases and the $\alpha_a, \alpha_g$ values are indicative of the total pressure drop of the heat exchanger.

The inverse relationship between pressure drop and the absolute values of the air and flue gas flow rates is a significant factor in the heat transfer techniques herein and the variable area operation of the heat exchanger as further discussed below. However, it should be appreciated that the pressure drop at a constant air or flue gas flow rate is substantially a function of the sand flow rate and, more particularly, the energy required to accelerate the sand during pneumatic conveyance, the lift energy to convey the sand from the bottom of the lift line into the vessel, the acceleration of the air as it is heated and the deceleration of the flue gas as it is cooled as they each flow through their respective lift lines, and the friction losses during pneumatic conveyance. The relative pressure drop contributions of these factors will vary depending upon the particular flow conditions, but the acceleration of the sand is a most significant factor and tends to maximize the rate of heat transfer, as previously discussed. The acceleration of the sand primarily occurs in the mixing zones for the indicated conditions of pneumatic conveyance, and it has also been observed in other portions of the lift line. For example, the formation of sand cloud layers has been observed above the level of the mixing zone 20a in the lift line 20. These cloud layers flow upwardly and downwardly at the interior wall surface of the lift line 20 and they are eventually picked up by the gaseous stream and moved upwardly.

The overall quantity of heat transferred between the primary and secondary fluids at constant air and flue gas flow rates will increase with increasing sand flow rates as reflected by the percent heat recovery values reported in Table I. For example, run Nos. 29 to 36 show that the percent heat recovery increases from 31% to 42% as the sand flow rate increases. The increasing sand flow rate will result in corresponding increases in pressure drop since the sand flow rate is the dominant factor in pressure drop. As the sand flow rate is increased to the upper practical limit of operation for which the heat exchanger is designed at the given air and flue gas flow rates, the corresponding increase in the quantity of heat transferred becomes less. This is shown by comparing the percent heat recovery values for runs Nos. 29 to 32 with those of run Nos. 33 to 36.

In the coupled mode of operation, the decreasing quantity of heat transferred as the sand flow rate approaches the design limits of the heat exchanger 10 is conveniently illustrated by consideration of the sensitivities of the air and flue gas outlet temperatures $t_{a2}$ and $t_{g2}$ to variation of the sand flow rate. Assuming ideal cocurrent heat exchange wherein the temperature of the sand and conveying fluid become equal during the pneumatic conveying steps, a heat balance of the exchanger 10 enables the ideal outlet temperatures $t_{a2}$ and $t_{g2}$ to be expressed in the following equations as functions of the inlet air and flue gas temperatures $t_{a1}$, $t_{g1}$ and the sand loadings $a_a$, $a_g$.

$$t_{a2} = \frac{(1 + a_g)t_{a1} + a_a t_{g1}}{(1 + a_a + a_g)} \quad (1)$$

$$t_{g2} = \frac{(1 + a_a)t_{g1} + a_g t_{a1}}{(1 + a_a + a_g)} \quad (2)$$

The derivative of each of the foregoing equations with respect to the sand flow rate results in the following equations which express the sensitivities of $t_{a2}$ and $t_{g2}$ to the sand flow.

$$\frac{dt_{a2}}{ds} = \frac{a_a(t_{g1} - t_{a1})}{s[1 + a_a(1 + \beta)]^2} \quad (3)$$

$$\frac{dt_{g2}}{ds} = \frac{-a_g(t_{g1} - t_{a1})}{s[1 + a_a(1 + \beta)]^2} \quad (4)$$

The sensitivity relationships for the runs of Table I are illustrated in FIG. 11 wherein the calculated sensitivities as defined in equations (3) and (4) are shown as a function of the sand flow rate. As shown in FIG. 11, the sensitivities or rates of change of the air and flue gas outlet temperatures decrease with increasing sand flow rates. Thus, the outlet temperatures are more responsive to variations in the sand flow rate in the lower range of sand flow rates. As the sand flow rate approaches the upper design limit for the particular system, only nominal further changes in the outlet temperatures are obtained. The quantity of heat transferred will follow the changes in the outlet temperatures since substantially equal air and flue gas flow rates exist in the coupled mode of operation.

Figure 12:
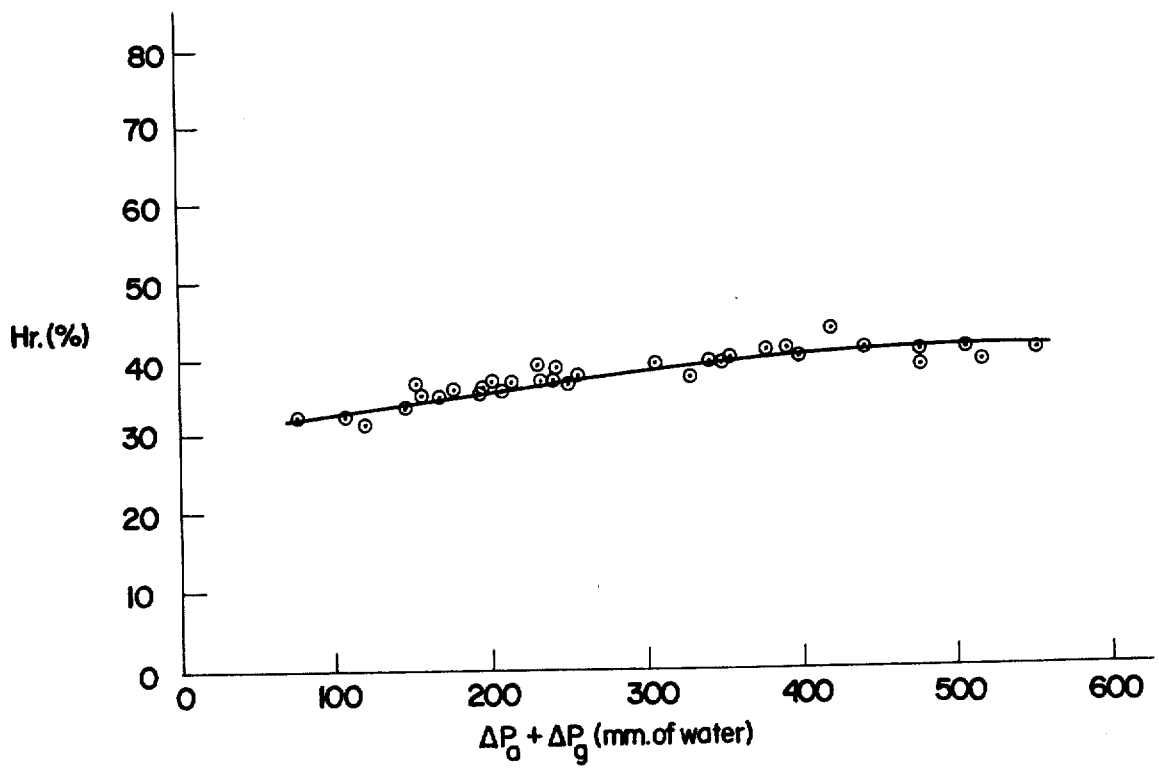
FIG. 12 is a graph illustrating the percent heat recovery as a function of the total pressure drop across the lift lines of the heat exchanger.

The foregoing relationships are further illustrated by consideration of the operation of the heat exchanger in terms of percent heat recovery and the total heat exchanger pressure drop as represented by the sum of the pressure drops in the lift lines 20 and 24. Referring to FIG. 12, the relationship between the percent heat recovery Hr and the total heat exchanger lift line pressure drops, $\Delta Pa$ plus $\Delta Pg$, is shown for the runs of Table I. In this instance, a single curve for all of the runs of Table I is appropriate since the variations in the absolute values of the air and flue gas flow rates are reflected in the total pressure drop.

It is apparent from FIG. 12 that the percent heat recovery is not substantially reduced by significant reductions in the pressure drop which directly reflects the power requirements of the system. For example, assuming operation at a pressure drop of 400 mm of water, the percent heat recovery is about 40%. If the pressure drop and power requirement are reduced by 50% by decreasing the sand flow rate, the reduction in the percent heat recovery is only about 4% to an Hr value of 36%. The pressure drop reductions and power requirement benefits to be obtained by further reductions in the sand flow rate become more costly in terms of percent heat recovery as the air and flue gas flow rates become more dominant in the system pressure drop at relatively low sand flow rates. However, it is apparent that the heat exchanger is operable over a significant range of conditions with acceptable variations in percent heat recovery. Thus, the power requirements for the heat exchanger can be minimized with only a minor decrease in the total amount of heat recovered in accordance with variable area operation of the heat exchanger. It should be appreciated that the decrease in the power requirement and sand flow rate will result in a decrease in the air outlet temperature and an increase in the outlet temperature of the vented flue gas as indicated in FIG. 11.

The operation of the heat exchanger system 10 in an uncoupled mode, with the primary fluid or flue gas and the secondary fluid or air both being vented to the atmosphere, is illustrated by the test runs reported below in Table II. The Ottawa Sand employed in these runs had a particle size of about 420 microns. In all cases, the heat exchanger system 10 was controlled by the automatic control arrangements 54 and 70, and the system was allowed to reach steady state operating conditions with the achievement of the selected pressure drop $\Delta Pa$ at the preset air and flue gas flow rates.

The indicated air flow rates resulted in air velocities into the lift line 20 ranging from 20 to 65 feet per second and exiting velocities ranging from 40 to 130 feet per second. The flue gas velocities into the lift line 24 ranged from 75 to 155 feet per second and the exiting velocities were 40 to 80 feet per second.

TABLE II

| Run No. | a | g | s | $\Delta Pa$ | $\Delta Pg$ | $a_a$ | $a_g$ | $\beta$ | $Qa^1$ | $Qg^1$ | Hr | Hr* | E |
|---|---|---|---|---|---|---|---|---|---|---|---|---|---|
| 41 | 3543 | 1517 | 22542 | 400 | 480 | 7.10 | 15.14 | 2.30 | 467 | 463 | 0.66 | 0.65 | 1.02 |
| 42 | 2994 | 1517 | 22339 | 440 | 530 | 8.46 | 15.20 | 1.80 | 422 | 457 | 0.50 | 0.62 | 0.81 |
| 43 | 2286 | 1538 | 10735 | 400 | 380 | 5.40 | 7.30 | 1.35 | 357 | 413 | 0.50 | 0.53 | 0.94 |
| 44 | 3050 | 1558 | 10847 | 400 | 370 | 4.04 | 7.17 | 1.77 | 413 | 440 | 0.57 | 0.59 | 0.97 |
| 45 | 3785 | 1558 | 10311 | 280 | 340 | 3.00 | 6.60 | 2.20 | 432 | 464 | 0.60 | 0.62 | 0.96 |
| 46 | 3798 | 1791 | 10862 | 260 | 360 | 3.15 | 6.10 | 1.94 | 424 | 462 | 0.56 | 0.60 | 0.95 |
| 47 | 2985 | 1936 | 16186 | 410 | 360 | 6.04 | 8.53 | 1.41 | 420 | 475 | 0.52 | 0.55 | 0.94 |
| 48 | 2152 | 1949 | 11350 | 390 | 300 | 6.05 | 6.12 | 1.01 | 350 | 433 | 0.43 | 0.46 | 0.92 |
| 49 | 4091 | 1949 | 9417 | 240 | 280 | 2.54 | 4.85 | 1.91 | 446 | 475 | 0.55 | 0.58 | 0.95 |
| 50 | 3707 | 1188 | 19531 | 440 | 680 | 5.60 | 15.71 | 2.81 | 399 | 351 | 0.71 | 0.70 | 1.00 |
| 51 | 3053 | 1188 | 21015 | 400 | 610 | 7.56 | 17.64 | 2.33 | 390 | 405 | 0.67 | 0.67 | 1.00 |
| 52 | 3161 | 1214 | 13915 | 310 | 420 | 4.84 | 11.44 | 2.36 | 388 | 402 | 0.66 | 0.66 | 1.00 |
| 53 | 4017 | 1214 | 10943 | 260 | 360 | 2.96 | 8.85 | 2.99 | 402 | 411 | 0.69 | 0.69 | 0.99 |
| 54 | 2123 | 1520 | 10017 | 330 | 280 | 5.44 | 6.88 | 1.26 | 307 | 452 | 0.42 | 0.52 | 0.81 |
| 55 | 1416 | 1256 | 10072 | 380 | 260 | 8.40 | 8.61 | 1.02 | 267 | 331 | 0.44 | 0.46 | 0.94 |
| 56 | 1526 | 1256 | 5366 | 210 | 150 | 4.19 | 4.58 | 1.09 | 268 | 323 | 0.44 | 0.47 | 0.95 |
| 57 | 1521 | 1256 | 4756 | 200 | 95 | 3.76 | 4.09 | 1.09 | 257 | 316 | 0.43 | 0.46 | 0.92 |
| 58 | 1517 | 1256 | 3844 | 160 | 80 | 2.96 | 3.22 | 1.09 | 247 | 310 | 0.41 | 0.45 | 0.91 |

TABLE II-continued

| Run No. | a | g | s | Δpa | Δpg | $\alpha_a$ | $\alpha_g$ | $\beta$ | $Qa^1$ | $Qg^1$ | Hr | Hr* | E |
|---|---|---|---|---|---|---|---|---|---|---|---|---|---|
| 59 | 1535 | 1256 | 3277 | 140 | 60 | 2.50 | 2.75 | 1.10 | 240 | 305 | 0.40 | 0.44 | 0.90 |
| 60 | 1457 | 1519 | 11217 | 380 | 240 | 9.22 | 8.04 | 0.87 | 297 | 381 | 0.40 | 0.44 | 0.92 |
| 61 | 1980 | 1844 | 10084 | 360 | 220 | 5.94 | 5.83 | 0.98 | 347 | 419 | 0.43 | 0.46 | 0.94 |
| 62 | 1139 | 1157 | 7065 | 390 | 280 | 7.32 | 6.57 | 0.90 | 219 | 286 | 0.40 | 0.44 | 0.92 |
| 63 | 1203 | 1156 | 5546 | 220 | 130 | 5.46 | 5.16 | 0.94 | 220 | 276 | 0.41 | 0.44 | 0.92 |
| 64 | 1601 | 1537 | 6418 | 230 | 130 | 4.74 | 4.47 | 0.94 | 291 | 381 | 0.40 | 0.44 | 0.90 |
| 65 | 1919 | 1929 | 6343 | 230 | 160 | 3.92 | 3.53 | 0.90 | 334 | 426 | 0.38 | 0.42 | 0.91 |
| 66 | 2782 | 1343 | 12576 | 260 | 280 | 5.26 | 9.65 | 1.83 | 488 | 578 | 0.56 | 0.61 | 0.92 |
| 67 | 3939 | 1343 | 10009 | 260 | 200 | 2.89 | 7.44 | 2.58 | 534 | 599 | 0.61 | 0.66 | 0.93 |
| 68 | 3952 | 1925 | 9771 | 260 | 200 | 2.89 | 5.22 | 1.81 | 622 | 765 | 0.51 | 0.57 | 0.89 |

[1] Number reported in thousands

As generally shown in Table II, the sand loadings of the air and flue gas, $\alpha_a$ and $\alpha_g$, were varied in the range of from about 2 to about 20. An increase in the sand loading at a given fluid flow rate will tend to provide an increase in the percent heat recovery Hr and the pressure drop, as previously discussed. In the uncoupled mode of operation, the air and flue gas flow rates can be independently varied and the test runs reported in Table II reflect variations in the weight ratio of the air to flue gas flow rates, $\beta$, ranging from about 1 to about 3. The quantity of heat transferred will increase with increases in $\beta$ and the effects of such variations are conveniently illustrated by consideration of the sensitivities of the ideal air and flue gas outlet temperatures $t_{a2}$ and $t_{g2}$ to variations of the air and flue gas flow rates. Through the use of the heat balance and similar techniques as discussed above, the following differential equations are obtained reflecting the sensitivities of the ideal air outlet temperature to the air flow rate a and the ideal flue gas outlet temperature to the flue gas flow rate g.

$$\frac{dt_{a2}}{da} = \frac{-\alpha_a(1 + \alpha_g)(t_{g1} - t_{a1})}{a(1 + \alpha_a + \alpha_g)^2} \quad (5)$$

$$\frac{dt_{g2}}{dg} = \frac{\alpha_g(1 + \alpha_a)(t_{g1} - t_{a1})}{g(1 + \alpha_a + \alpha_g)^2} \quad (6)$$

The sensitivities of the outlet temperatures, as shown by equations (5) and (6), similarly respond to variations in the air and flue gas flow rates, with $t_{a2}$ decreasing with increases in a and $t_{g2}$ increasing with increases in g. The effect of varying $\beta$ is illustrated by considering the responsiveness of the air outlet temperature to equal fractional changes in the air flow rate and in the sand flow rate since in practical heat exchanger applications the sand and air flow rates will be determined in view of the primary fluid or flue gas flow rate of the process to which the heat exchanger is applied. Accordingly, assuming the same percent weight changes in s and a or, ds/s=da/a, the following equation is obtained for the air/sand sensitivity ratio.

$$\frac{(dt_{a2})_a}{(dt_{a2})_s} = -[1 + \beta\alpha_a] \quad (7)$$

Figure 13:
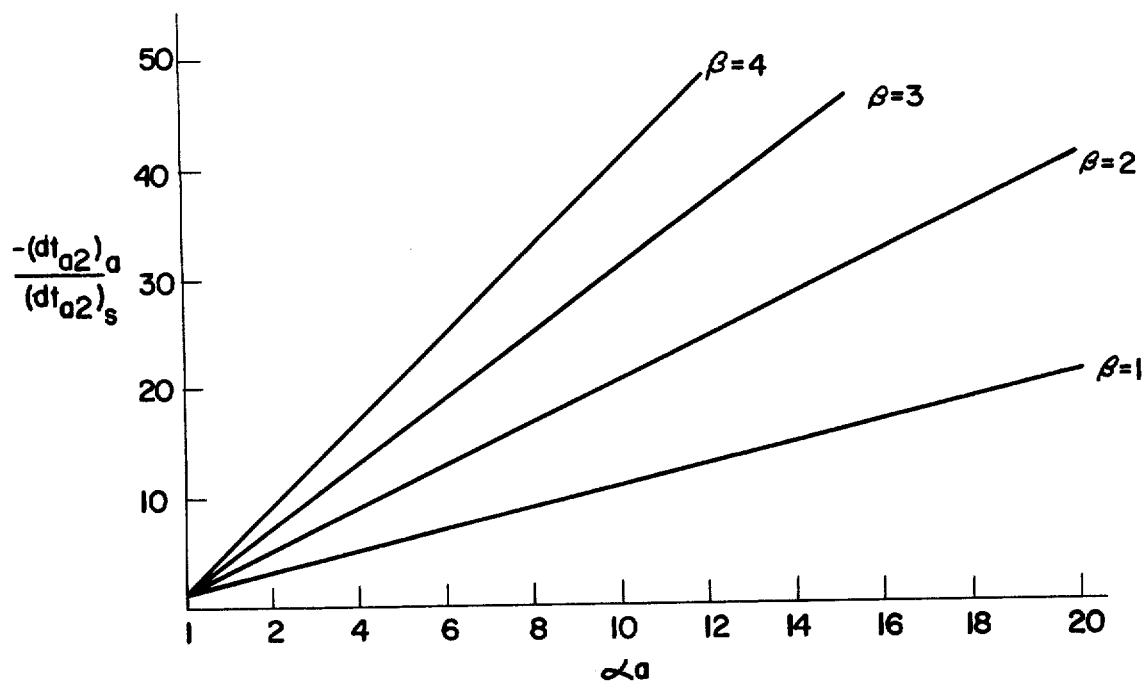
FIG. 13 is a graph illustrating the theoretical responsiveness of the air outlet temperature to equal fractional changes in the air and particulate material flow rates at various operating conditions for the heat exchanger.

The air outlet temperature is more sensitive, and is in the opposite direction, to change in the air flow rate than to change in the sand flow rate as shown by equation (7). This relationship is illustrated in FIG. 13 where the air/sand sensitivity ratio for the indicated $\beta$ values are shown as a function of $\alpha_a$. Assuming an $\alpha_a$ value of 2 and a $\beta$ of 1, the air outlet temperature is three times more sensitive to a change in the air flow rate as compared with an identical weight percentage change in the sand flow rate. If the $\alpha_a$ value is increased to 4, indicating a higher sand loading, and $\beta$ is maintained at a value of 1, the air/sand sensitivity ratio increases to a value of 5. This further increase in the ratio to a value of 5 reflects that the air outlet temperature is less responsive to variations in the sand flow rate in the upper range of sand flow rates as discussed above with respect to FIG. 11. Similar observations may be made for the further values of $\beta$ as shown in FIG. 13. In all cases, modulation of the sand flow rate enables relatively more precise regulation of the outlet temperature $t_{a2}$.

The percent heat recovery Hr is responsive to variations in $\beta$, and the relationship between Hr and $\beta$ at variable sand flow rates is illustrated by consideration of the theoretical operation of heat exchanger 10 at a fixed flue gas flow rate and constant flue gas and air inlet temperatures. Under these conditions, a theoretical percent heat recovery Hr*, as defined above, may be determined for the heat exchanger 10. For this purpose, the ideal air outlet temperature $t_{a2}$ is determined under assumed operating conditions using equation (1), and the resulting quantity of heat transferred is compared with the quantity heat theoretically available if the flue gas inlet temperature $t_{g1}$ was reduced to the air inlet temperature $t_{a1}$. This is expressed mathematically as follows:

$$Hr^* = \frac{ac_a(t_{a2} - t_{a1})}{gc_g(t_{g1} - t_{a1})} \times 100 \quad (8)$$

In equation (8), $t_{a2}$ is determined by means of equation (1) as indicated above and substitution of equation (1) into equation (8) results in the following expression for Hr*:

$$Hr^* = \frac{\beta}{\frac{1}{\alpha_a} + (1 + \beta)} \times 100 \quad (9)$$

Figure 14:
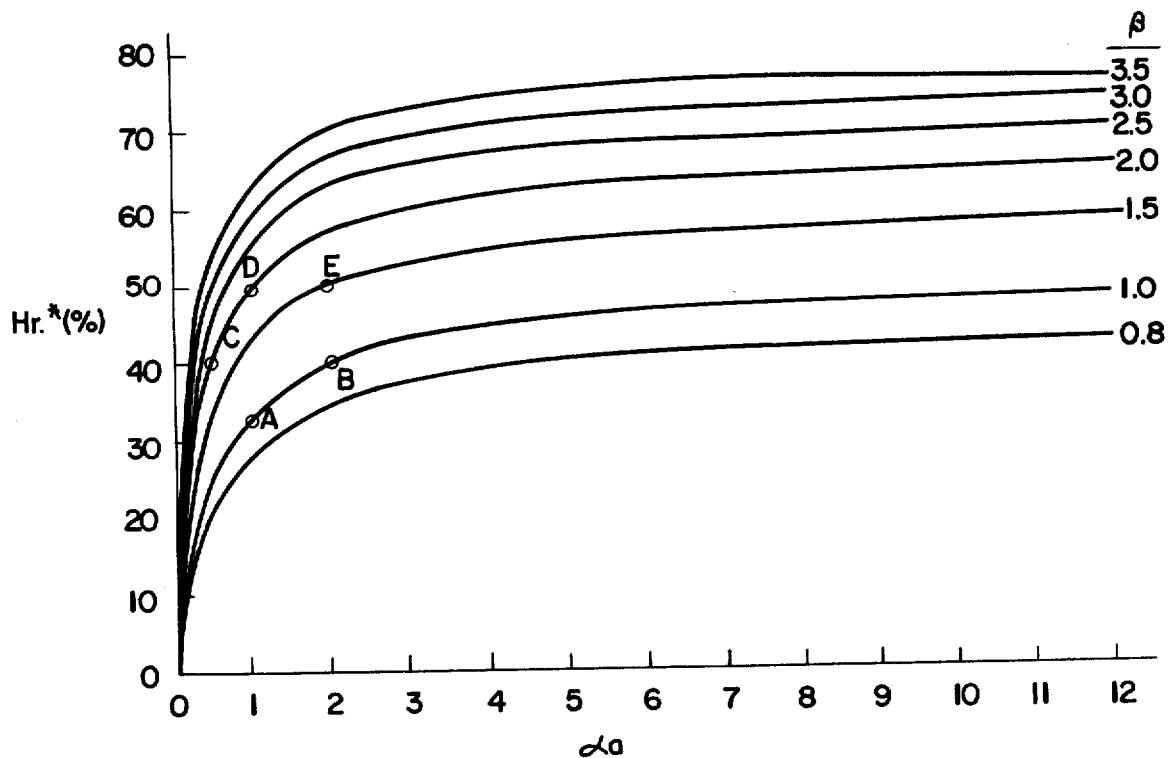
FIG. 14 is a graph illustrating the theoretical percent heat recovery as a function of the air, flue gas and particulate material flow rates.

The theoretical percent heat recovery Hr* is shown as a function of $\alpha_a$ for the indicated values of $\beta$ in FIG. 14. The $\alpha_a$ value is selected in this instance since it reflects variations in the quantity of heat transferred resulting from the relative sand loading per se and it is indicative of the pressure drop of the heat exchanger resulting from the pneumatic conveyance of the sand through the lift line 20. The relative sand loading of the flue gas, $\alpha_g$, is not affected by variation of $\beta$ at a fixed flue gas flow rate, but it is affected by a change in the sand flow rate and results in corresponding changes in the pressure drop and the quantity of heat transferred on the flue gas side of the heat exchanger as the sand is pneumatically conveyed through the lift line 24. However, it is convenient in FIG. 14 to reference the percent heat recovery against the $\alpha_a$ values for the indicated $\beta$ values since the $\alpha_a$ value is determined by the selection of the $\alpha_a$ and $\beta$ values in a system having a fixed flue gas flow rate as considered herein and generally encountered in practical applications of the heat exchanger.

Referring to FIG. 14, as the sand loading or $\alpha_a$ value is increased at a given value of $\beta$, the percent heat recovery and air outlet temperature will each increase in the same manner as discussed above with respect to FIG. 11. Further, it is apparent from FIG. 14 that Hr* will increase with increasing $\beta$ values. An increase in the $\beta$ value and, more particularly, the air flow rate herein enables higher sand flow rates to be used without corresponding increases in pressure drop on the air side of the heat exchanger. Accordingly, operation of the heat exchanger with unequal air and flue gas flow rates and $\beta$ values greater than 1 is particularly advantageous.

The Hr* value tends to approach a limit for each value of $\beta$ as the sand flow rate increases. These limits can be determined from equation (9) by deletion of the reciprocal $\alpha_a$ term as its value approaches zero at increasing values of $\alpha_a$ resulting from increasing sand flow rates. Under these conditions, equation (9) indicates that for a $\beta$ value of 1, the limit of Hr* is 50%. Similarly, the limit of Hr* for a $\beta$ value of 2 is 66.7% and, for a $\beta$ value of 3, the limit of Hr* is 75%.

The responsiveness of the percent heat recovery to specific variations in $\beta$ at variable sand flow rates and the resulting fluid outlet temperatures are illustrated with respect to FIG. 14 through the use of Table III below. The resulting ideal outlet temperatures $t_{a2}$, $t_{g2}$ and theoretical percent heat recovery Hr* were calculated for the indicated operating conditions for an assumed flue gas inlet temperature $t_{g1}$ equal to 2,000° F. and air inlet temperature $t_{a1}$ equal to 100° F. The specific heats of the air, flue gas and sand were assumed to be equal throughout the indicated range of temperatures.

TABLE III

| Point | a | g | s | $\alpha_a$ | $\alpha_g$ | $\beta$ | $t_{g2}$ | $t_{a2}$ | Hr* |
|---|---|---|---|---|---|---|---|---|---|
| A | 1000 | 1000 | 1000 | 1 | 1 | 1 | 1367 | 733 | 33.3 |
| B | " | " | 2000 | 2 | 2 | 1 | 1240 | 860 | 40.0 |
| C | 2000 | " | 1000 | 0.5 | 1 | 2 | " | 480 | 40.0 |
| D | " | " | 2000 | 1 | 2 | 2 | 1050 | 575 | 50.0 |
| E | 1500 | " | 3000 | 2 | 3 | 1.5 | " | 733 | 50.0 |
| F | 2000 | " | 2667 | 1.3 | 2.7 | 2 | 985 | 605 | 53.4 |
| G | 3000 | " | 3000 | 1 | 3 | 3 | 860 | 480 | 60.0 |

Referring to Table III and FIG. 14, the steady state operating point A for the heat exchanger 10 is shown. At operating point A, the air, flue gas and sand flow rates are each 1,000 lbs./hr. and the theoretical percent heat recovery Hr* is about 33%. Under these conditions, the flue gas temperature is reduced from 2,000° F. to 1,367° F. and the air temperature is increased from 100° F. to 733° F.

Assuming that the sand flow rate is increased to 2,000 lbs./hr. and the heat exchanger is allowed to reach steady state, operation at point B is obtained. The increase in the sand flow rate results in an increase in the $\alpha_a$ and $\alpha_g$ values and the value of $\beta$ remains 1. Under these conditions of operation at point B, the air outlet temperature is increased to 860° F., the percent heat recovery Hr* is increased to 40% and the flue gas outlet temperature is decreased to 1,240° F. as compared with point A operation.

If steady state operation is again assumed at point A and the air flow rate is doubled instead of the sand flow rate, operation at point C is attained. In this instance, $\alpha_a$ is decreased to 0.5, $\beta$ is increased to 2, and the percent heat recovery is again increased to 40%. Although an equal increase in the percent heat recovery is obtained upon equal increases in the air or sand flow rates provided the latter are initially equal, the air outlet temperature is reduced to 480° F. by operation at point C as compared with point B and the same flue gas outlet temperatures result.

If the steady state operation at point C is varied by increasing the sand flow rate to 2,000 lbs./hr., the sand loading or $\alpha_a$ value increases to 1 along the curve for $\beta$ equal to 2, and operation at point D is attained. As shown in Table III, the increase in the sand loading as compared with point C results in an increase in $t_{a2}$ to 570° F. and the percent heat recovery is increased to 50%. Further increases in the sand loading to result in values of $\alpha_a$ equal to about 3.5 will result in additional increases in the outlet temperature $t_{a2}$ and about an additional 11% increase in Hr* to a value of about 61%. As the sand loading is further increased to provide values of $\alpha_a$ on the order of about 5 and greater, the further increases in the outlet temperatures $t_{a2}$ are not as great and the Hr* limit value of 66.7% is approached for operation at a $\beta$ value of 2.0.

A comparison of operation at points A and D indicates that the total heat recovery when both the air and sand flow rates are increased an equal amount is greater than the sum of the individual recoveries provided by an increase in either of the flow rates alone. Specifically, operation at points B and C each result in about a 6.7% increase in Hr* as compared with point A in contrast with the 16.7% increase in the Hr* value obtained by operation at point D. This synergistic effect continues as both the air and sand flow rates are further increased to the design limits of the system and the synergistic effect, or, more particularly, the additional quantity of heat transferred relative to that resulting from the individual changes, progressively decreases since the total quantity of heat available for recovery is fixed.

In further illustration of the variable area operation of the heat exchanger, operation at point E is considered. Under the conditions indicated in Table III, a 50% heat recovery is obtained and the air outlet temperature is 733° F. Thus, as compared with operation at point A, the same air outlet temperature is maintained and the percent heat recovery is increased. It should be appreciated that the total heat exchanger pressure drop will be larger at point E as compared with points A or D. However, the flexibility of the variable area system is well illustrated by the foregoing examples and recognition of the fact that both the air flow rate and the sand flow rate are continuously variable throughout the designed range of operation of the heat exchanger.

In illustration of the effect of varying $\beta$ while maintaining a constant total heat exchanger pressure drop, reference is made to operating points B, F and G of Table III. The indicated air and sand flow rates for these operating points result in increasing $\beta$ values and a constant total value for the sum of $\alpha_a$ plus $\alpha_g$, the latter being indicative of a constant total pressure drop with recognition that the actual pressure drops displayed by the two sides of the exchanger vary as discussed above with respect to FIG. 10. As indicated in Table III, theoretical percent heat recovery values of 40%, 53% and 60% are respectively obtained for $\beta$ values of 1, 2 and 3.

The increases in the percent heat recovery are accompanied by decreases in the secondary fluid outlet temperature, and $t_{a2}$ values of 860° F., 605° F. and 480° F. are obtained. Generally, the $\beta$ value will not be greater than about 5 since the resulting temperature at which the secondary fluid is recovered will be relatively low in the absence of unusual user requirements. Accordingly, the heat exchanger may be designed and operated to recover the flue gas heat in the secondary fluid at various flow rates and temperatures depending upon user requirements.

Figure 15:
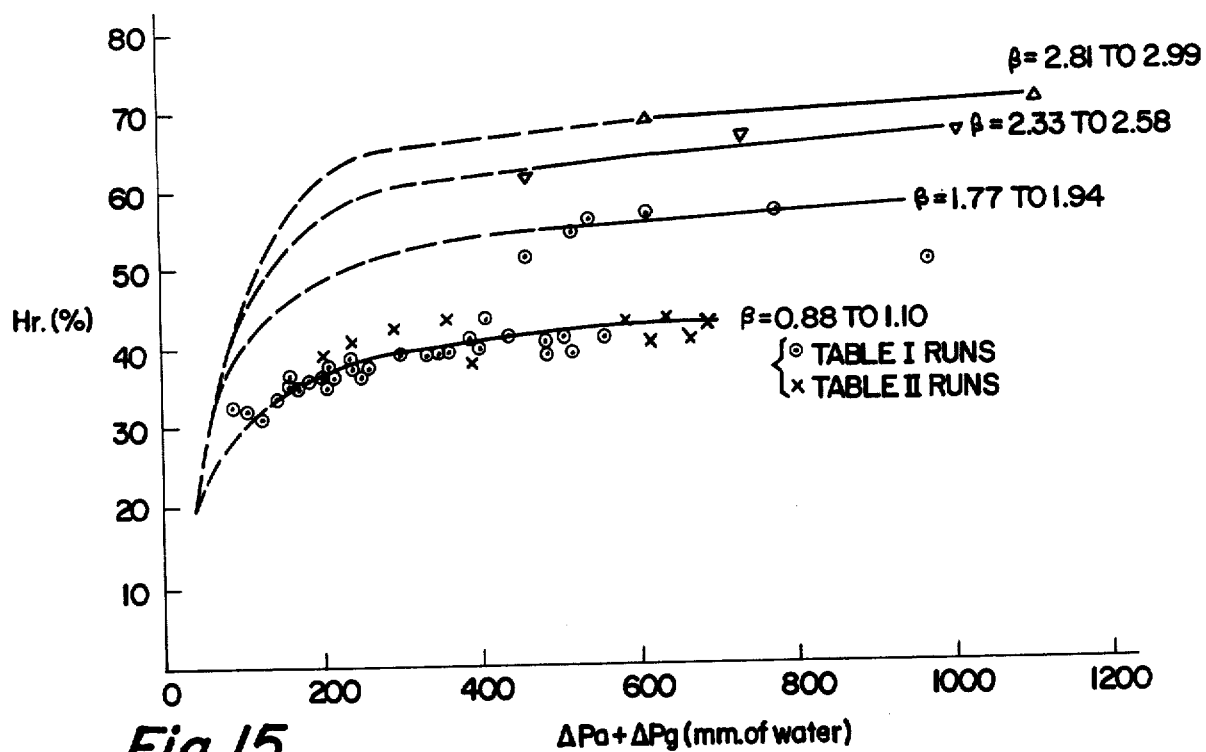
FIG. 15 is a graph illustrating the percent heat recovery achieved by the heat exchanger as a function of the total pressure drop across the lift lines.

Referring to FIG. 15, the relationship between the percent heat recovery Hr and the total heat exchanger lift line pressure drops is shown for selected test runs of Tables I and II. In this instance, the test runs are grouped in accordance with the indicated $\beta$ ranges and a single curve is drawn for each $\beta$ range for purposes of convenience. The curves of FIG. 15 and the dotted portions thereof are drawn in accordance with the relationships shown in FIG. 14.

As shown in FIG. 15, the same relationships between Hr and $\beta$ at variable sand flow rates are observed with respect to the total heat exchanger lift line pressure drops or $\alpha_a$ as discussed above with respect to FIG. 14, since the pressure drop is a function of both the sand flow rate and the absolute air and flue gas flow rates. Accordingly, the percent heat recovery will increase at a given value of $\beta$ as the total system pressure drop increases as a result of increased sand flow rates. Similarly, increases in the percent heat recovery are obtained with increasing values of $\beta$ and such increases may be obtained at a substantially constant total system pressure drop. For example, if $\beta$ is varied through the ranges indicated in FIG. 15 by increasing the air flow rate as well as the sand flow rate to maintain a total pressure drop of 650 mm of water, the percent heat recovery is increased from about 43% to 69%. The additional heat recovered by increasing $\beta$ is recovered at a lower air outlet temperature assuming a constant flue gas inlet temperature and flow rate.

The actual percent heat recovery achieved closely follows the theoretical recovery, as shown by the efficiency values, E, reported in Tables I and II. The reported efficiencies effectively compare the actual percent heat recovery with the theoretical percent heat recovery which could be expected if ideal cocurrent heat exchange was attained. As shown in Tables I and II, the efficiency values are generally 90% or more without allowance for heat losses. The efficiency of the heat exchanger in transferring heat between the primary and secondary fluids is substantially unaffected by the specific operating conditions such as the flue gas inlet temperature, the absolute values of the air and gas flow rates and the total heat flux. Accordingly, the design and operation of the exchanger is not restricted per se to optimum operating efficiency ranges or conditions, but rather, the exchanger is readily applied to a wide variety of systems and displays the same relatively high efficiencies for the selected level of heat recovery at a predetermined pressure drop and/or a desired fluid outlet temperature.

The foregoing characteristics of the heat exchanger system 10 enable it to be operated as a variable area heat exchanger with acceptable levels of heat recovery upon modulation of the sand flow rate and area of the heat exchange surface as a function of a preselected pressure drop and/or outlet temperature of the exchanger itself or of the system to which the exchanger is applied. Variable area operation is most effective at relatively lower pressure drops, $\alpha_a$ values no greater than about 5 and generally in the range of from 1 to 4, where the secondary fluid outlet temperature and the relative amount of heat transferred display greater sensitivity to changes in the sand flow rate or area of the heat exchange surface. Further, operation at relatively lower $\alpha_a$ values is also favored since the quantity of heat transferred and effect upon the outlet temperature per unit of sand flow are not as costly in terms of pressure drop. The achievement of violent mixing zones as a characteristic of the pneumatic conveyance is readily obtained for the indicated values and contributes to the efficiency of heat transfer, as previously discussed.

The variable area capabilities of the heat exchanger enable it to be readily integrated with a system to which it is applied. For example, if the exchanger 10 is applied to a process which itself has a variable pressure drop, the control arrangement 54 may be arranged to sense the combined pressure drop of the system 10 and such other process with modulation of the sand flow rate to achieve a desired combined pressure drop or to deliver the secondary fluid to the other process at a desired pressure. Further, an operating temperature of the applied system could be monitored as a control parameter in the feed control arrangement 54 and combined with pressure drop regulation to assure a maximum sand flow rate which is less than the choking velocity of the heat exchanger lift lines. In all cases, the operation of the heat exchanger is controlled with modulation of the sand flow rate to provide direct internal variation of the area of the heat exchange surface and the desired pressure drop and/or fluid outlet temperature.

It is apparent that the heat exchanger 10 may be efficiently and effectively employed with preselected operating characteristics to accommodate the requirements of the system to which it is applied. If maximization of the overall quantity of heat recovered is desired, the exchanger 10 may be operated at relatively high sand flow rates and pressure drops or a cascade arrangement comprising two heat exchangers 10 connected in series can be used to obtain a substantially maximum percent heat recovery with a minimization of the power requirement and expense since the total power requirement for the cascaded system would still represent a reduction in cost. Alternatively, the relatively cool flue gas after traveling through the heat exchanger 10 can be directly handled in a more conventional heat exchanger such as a shell and tube arrangement.

In illustration of cocurrent heat transfer in accordance with the present invention, intermediate temperatures of the air and flue gas during pneumatic conveyance are reported for the test runs of Table IV. In these runs, the heat exchanger 10 was modified to substitute settling chambers for the vessels 12,14, the bonnets 40, 44 being retained, and the outlet temperatures $t_{a2}$ and $t_{g2}$ were measured at the outlets of the settling chambers. The phase separation of the sand and the fluids was substantially achieved through the use of the bonnets 40,44.

TABLE IV

| Run No. | g | a | s | $t_{s1}$ | $t_{a1}$ | $t_{a4}$ | $t_{a5}$ | $t_{a2}$ | $t_{s2}$ | $t_{g1}$ | $t_{g6}$ | $t_{g7}$ | $t_{g2}$ | E |
|---|---|---|---|---|---|---|---|---|---|---|---|---|---|---|
| 69 | 1146 | 1529 | 5633 | 990 | 125 | 720 | 800 | 800 | 830 | 1785 | 1020 | 990 | 930 | 1.00 |

TABLE IV-continued

| Run No. | g | a | s | $t_{s1}$ | $t_{a1}$ | $t_{a4}$ | $t_{a5}$ | $t_{a2}$ | $t_{s2}$ | $t_{g1}$ | $t_{g6}$ | $t_{g7}$ | $t_{g2}$ | E |
|---|---|---|---|---|---|---|---|---|---|---|---|---|---|---|
| 70 | 1529 | 1529 | 5568 | 1065 | 130 | 720 | 850 | 850 | 890 | 1790 | 1220 | 1100 | 1040 | .93 |
| 71 | 1911 | 1911 | 5904 | 1020 | 130 | 650 | 750 | 810 | 830 | 1650 | 1200 | 1080 | 1020 | .98 |
| 72 | 1911 | 3057 | 5200 | 960 | 130 | 390 | 620 | 665 | 700 | 1650 | 1140 | 990 | 960 | 1.04 |

Figure 16:
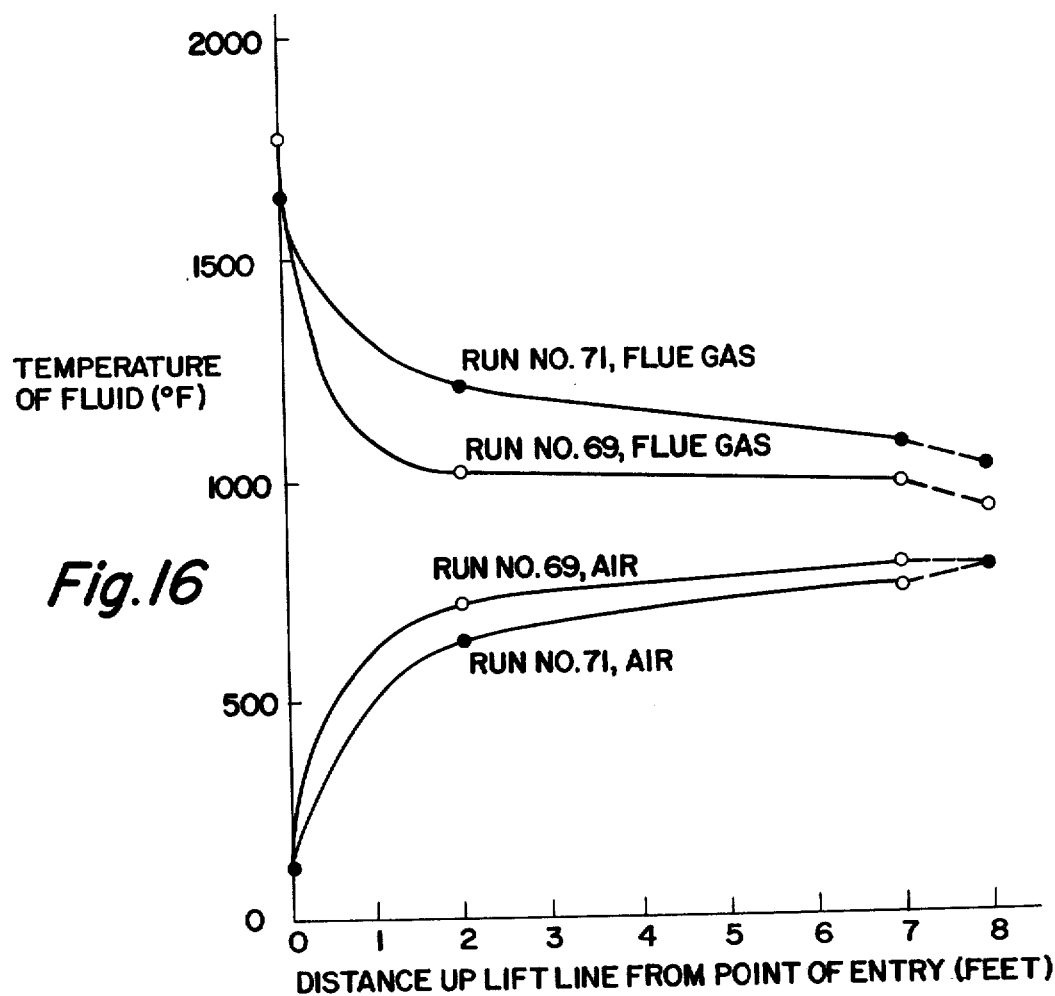
FIG. 16 is a graph illustrating the temperature profiles of the air and flue gas during pneumatic conveyance.

As shown by the runs reported in Table IV, the bulk of the heat transfer is completed in the first part of each of the lift lines for typical sand, air and flue gas flow rates and efficient operation of the heat exchanger 10 is achieved in all cases. The rapidity of the heat transfer process is particularly illustrated by run Nos. 69 and 70, and it is demonstrated by comparison of the fluid temperatures at the indicated points during pneumatic conveyance in each of the lift lines with the outlet temperatures $t_{a2}$, $t_{g2}$. The temperature profile for each of the lift lines is shown in FIG. 16 for run No. 69 wherein it is apparent that the outlet temperatures $t_{a2}$, $t_{g2}$ are substantially obtained at the two-foot level and fully developed at the seven-foot level. Under these operating conditions, the heat transfer process is substantially completed by the time the gas-solids streams exit from the lift lines.

The rapidity of the heat transfer process generally decreases with increasing air and flue gas flow rates, as shown by run Nos. 71 and 72 in Table IV. Under such operating conditions, reasonable quantities of heat continue to be transferred throughout the lift line portion of the pneumatic conveying step, and the further heat transfer which occurs as a result of the violent mixing within the bonnets 40,44 becomes apparent. This is illustrated in FIG. 16 for run No. 71. As shown in FIG. 16, a substantial portion of the heat transfer again occurs prior to the time the fluids reach the two-foot level, and a moderate degree of heat transfer is experienced as the fluids continue to flow through the lift lines.

The quantity of heat transferred by the time the fluids exit from the lift lines as indicated by temperatures $t_{a5}$, $t_{a7}$, is believed to be affected to a degree by the further heat transfer occurring within the bonnets 40,44, since these temperatures are sensed at a location about 18 inches below the violent mixing occurring within the bonnets. However, the further heat transfer indicated by the dotted portions of the curves in FIG. 16 for Run No. 71 is believed to be exclusively associated with the bonnets, since the temperatures $t_{a2}$,$t_{g2}$ are each sensed about one foot downstream of the bonnets and the sand is substantially disengaged from the fluid phases within the bonnets.

Referring to FIGS. 17 through 19, a heat exchanger 100 of modified design is shown. The heat exchanger 100 includes first and second operating or separation vessels 102 and 104 which comprise adjacent, axially aligned, horizontal cyclones separated by a common wall 105. A solid particulate material 106, similar to the sand 16, is circulated between the vessels 102, 104 for purposes of heat transfer with gaseous media. The particulate material 106 is withdrawn from the vessel 102 by means of a downcomer 108 and pneumatically transferred to the vessel 104 through an associated lift line 110. Similarly, the vessel 104 is provided with a downcomer 112 communicating with an associated lift line 114 for purposes of transporting the particulate material 106 from the vessel 104 to the vessel 102.

In this embodiment, the primary fluid or hot flue gas from which heat is to be recovered is introduced into the lift line 114 through a lower lift line elbow 116, and the cooled flue gas is vented through a cyclone outlet 118. On the other side of the heat exchanger 100, the secondary fluid or ambient air is introduced into the lift line 110 through a lower lift line elbow 120 which is identical in structure with the elbow 116, and the preheated air is removed from the vessel 104 through a cyclone outlet 122.

The downcomers 108, 112 respectively include horizontal leg portions 108a and 112a. Accordingly, the particulate material 106 is withdrawn through each of the downcomers 108, 112 as a loose packed bed column and a gravity feed-lock technique identical to that employed in the embodiment of FIG. 1 is used. To that end, each of the downcomers is provided with a biasing means or trigger air supply to cause the particulate material 106 accumulated in the leg portions 108a and 112a to spill over into the respective lift lines 110 and 114 during automatic feed. Further, it is also convenient to employ radial feed of particulate material into the lift line 110 and tangential feed of the particulate material into the lift line 114 for the same reasons as indicated with respect to the embodiment of FIG. 1.

The heat exchanger 100 includes a feeder vessel 124 for providing an automatic make-up supply of particulate material 106. The feeder 124 has a supply leg 126 extending below the level of the desired inventory of particulate material retained above the downcomer 106. A pressure line 128 communicates between the feeder 124 and the vessel 102 for purposes of maintaining equal gas pressures in each of the vessels. The supply leg 126 includes an outlet opening 126a located at the desired level of inventory of particulate material 106 above the downcomer 108. If the level of the inventory falls below the desired value, additional particulate material 106 will flow through the supply leg 126 until an accumulation of particulate material is formed at its natural angle of repose adjacent the outlet opening 126a.

With particular reference to FIGS. 18 and 19, the details of the vessel 102, the downcomer 108, and the lift line 114 are shown, it being understood that the vessel 104 and its downcomer and lift line are similarly constructed. The particulate material 106 being pneumatically conveyed through the lift line 114, while undergoing cocurrent heat transfer with the gaseous conveying medium, enters into the vessel 102 through an inlet opening 102a. The particulate material 106 sweeps around the inside periphery of the vessel 102 in a counterclockwise direction, as shown in FIG. 19. As the velocity of the particulate material 106 decreases and separation from the gaseous conveying media occurs, the particulate material passes through a vessel outlet opening 102b disposed at an angularly remote location relative to the inlet opening 102a. The outlet 102b opens into a downcomer collection trough 108b, which in turn communicates with the downcomer 108 and receives the inventory of particulate material 106. The collection trough 108b is connected about the opening 102b into the vessel 102 with a fluid tight seal to prevent the escape of gaseous media or particulate material.

The heat exchanger 100 is controlled in the same manner as the heat exchanger 10. Accordingly, the automatic control arrangements 54 and 70 are incorporated in the heat exchanger 100 in the same manner as employed in the heat exchanger system 10. More particularly, the feed control arrangement 54 is arranged to regulate the withdrawal of particulate material 106 through the downcomer 108 from the vessel 102 as a function of the pressure drop through the lift line 110. The control arrangement 70 is again employed in a following manner to regulate the level of inventory in a downcomer collection trough 112b by modulation of the trigger air supply to the leg portion 112a. Further, the temperature sensor 63 and temperature control arrangement are employed in the heat exchanger 100 by sensing the outlet temperature of the secondary fluid or air exiting from the cyclone outlet.

The heat exchanger 100 is particularly structurally efficient, since the vessels 102, 104 comprise cyclonic separators, and the unit is designed to illustrate the minimum inventory requirement for the particulate material 106b. In practice, a 500,000 Btu/hr. unit requires only 6 square feet of floor space and a 10-foot vertical clearance. As indicated above, the heat exchanger 100 is comparable in capacity and capability with the heat exchanger system 10 and, accordingly, the heat exchanger 100 also provides similar advantages over prior art devices.

Referring to FIG. 20, a heat exchanger system or unit 200 having a zero loop flow path and arranged to recover heat from hot flue gas is shown. The heat exchanger 200 includes a first operating vessel 202 and a second operating vessel 204 between which particulate material 206 is circulated for purposes of heat transfer with gaseous media. Accordingly, the particulate material is withdrawn from a flowing inventory thereof maintained in the lower portion of the vessel 202 through a downcomer 208 and pneumatically transferred to the vessel 204 through an associated lift line 210. The particulate material 206 is separated from the gaseous conveying medium in the vessel 204 and collected within a flowing inventory thereof within the vessel. The particulate material 206 is withdrawn from the vessel 204 through an associated downcomer 212 and transferred to the vessel 202 for countercurrent contact with the gaseous stream flowing upwardly through the vessel.

For purposes of illustration, the heat exchanger 200 is shown applied to a burner-furnace simulator 214 which is substantially identical to the simulator 34 and generates a primary fluid comprising hot flue gas containing sufficient thermal energy to warrant heat recovery. The hot flue gas generated by the simulator 214 is introduced through flue gas inlet 216 into the vessel 202. The flue gas flows upwardly through the vessel 202 in countercurrent contact with the downwardly moving particulate material 206, as described in greater detail below, and the cooled flue gas is withdrawn from the vessel 202 through an upper flue gas outlet 218. Typically, the flow of flue gas through the vessel 202 will be sustained by natural chimney draft, and countercurrent heat exchange and phase separation are achieved with no significant pressure drop or energy requirement on this side of the heat exchanger. However, a suction fan (not shown) may be applied to the vessel 202 if such is required in a particular application. The secondary fluid to which the heat recovered from the flue gas is to be transferred during the pneumatic conveyance of the particulate material comprises a stream of ambient air delivered to the lift line 210 by a blower 220. The secondary fluid may be used as preheated combustion air in the process from which the flue gas is derived, or it may be used in a separate process.

The vessel 202 has a generally cylindrical configuration, with tapered end portions and an intermediate baffle assembly 222 which is arranged to assure effective countercurrent heat exchange contact between the flue gas and downwardly flowing particulate material 206 while defining a sufficiently open gaseous flow path to assure a natural draft for purposes of maintaining flue gas flow. The baffle assembly 222 includes open-ended funnel baffles 224 and intermediately disposed cone distributor baffles 226. The upper open end of each of the baffles 224 has a diameter substantially corresponding with the inside diameter of the cylindrical portion of the vessel 202, and the upper ends of each of the baffles 224 are secured to the adjacent wall of the vessel 202, as by welding. The upper ends of the baffles 226 are sized to receive the lift line 210, and they are secured to the lift line by any convenient means, such as welding.

In FIG. 20, the downward flow of the particulate material 206 through the baffle assembly 222 is somewhat diagrammatically shown for purposes of clarity of illustration, and it should be appreciated that the particulate material 206 actually flows downwardly through the baffle assembly 222 as an annular curtain. To that end, the downcomer 212 encircles an upper portion of the lift line 210, and an annular shaped, loose packed bed column of particulate material is formed between the adjacent concentric walls of the downcomer and the lift line. The downcomer 212 includes a laterally extending portion 212a mounted to the lift line 210. The laterally extending portion 212a includes an upper annular surface 212b which is spaced below the lower end of the radially confining wall of the downcomer 212 to provide an accumulation of particulate material adjacent the bottom of the column thereof contained within the downcomer. Upon application of trigger air, the particulate material spills from the accumulation into the upwardly flowing flue gas in an annular flow pattern.

The particulate material spilling from the accumulation thereof adjacent the bottom of the downcomer 212 is guided by a cone surface 212c of the portion 212a into a radially outward flow direction for engagement with the adjacent baffle 224. As shown in FIG. 20, the radially outward flow direction is reversed upon engagement with the baffle 224, and the particulate material is then directed in a radially inward flow direction into engagement with the adjacent baffle 226. The radially inward flow direction is again reversed by the baffle 226, and the particulate material is then directed into engagement with the adjacent lower baffle 224. This flow pattern of the particulate material is repeated as it passes downwardly into engagement with the remaining baffles 224 and 226 as a cascading annular curtain of particles.

The flue gas entering the vessel 202 through the inlet 216 passes in a transverse direction through the adjacent annular portion of the curtain of particulate material falling from the lowermost baffle 224 and the remote portion of the annular curtain flows along a truncating end wall 202a of the vessel 202 and serves to insulate the vessel wall from the incoming flow of hot flue gas. The flue gas flows upwardly and traverses each of the curtains of particulate material formed between the baffles 222 and 224 as shown by the flow arrows. Upon traversing the curtain of particulate material formed between the laterally extending portion 212a and the adjacent baffle 224, the now cooled flue gas passes upwardly through the annular space between the vessels 202 and 204 and it is vented through the outlet 218. In this manner, countercurrent heat exchange is provided on the flue gas side of the heat exchanger 200, and the baffle assembly 222 effectively provides an eight-pass countercurrent flow exchanger.

Following countercurrent heat exchange with the flue gas, the hot particulate material 206 is directed by the wall 202a to the open upper end of the downcomer 208 and withdrawn from the bottom of the vessel 202 through the downcomer. The loose packed bed column of particulate material formed in the vertical portion of the downcomer 208 provides a dynamic seal between the flue gas and the air to be heated in the lift line 210. An accumulation of particulate material is formed in the laterally extending portion 208a of the downcomer 208, and trigger air is used to bias the particulate material into the lift line 210.

In the lift line 210, the particulate material undergoes cocurrent heat exchange with the ambient air as the latter pneumatically conveys it into the vessel 204. Upon exiting from the lift line 210, the gas-solids stream is impacted against a bonnet 228 for purposes of phase separation and further heat transfer in a manner similar to that discussed in the prior embodiments. The relatively cool particulate material is collected within the vessel 204 and withdrawn therefrom through the downcomer 212. The heated ambient air exits from the vessel 204 through an outlet 230. Accordingly, the heat transfer process on the secondary fluid side of the heat exchanger 200 is substantially identical with that described in previous embodiments.

The location of the lift line 210 and vessel 204 within the vessel 202 is structurally compact and minimizes heat loss on the air side of the exchanger 200. However, it should be appreciated that the lift line 210 and vessel 204 may be arranged exteriorly of the vessel 202. Further, in an exterior arrangement or in the illustrated arrangement, it is not necessary that the downcomer 212 concentrically receive the upper portion of the lift line 210, since the downcomer and lift line may be laterally spaced as in the heat exchangers 10 and 100. In such arrangements, the flow of particulate material from the downcomer 212 may be distributed into the flue gas and baffle assembly 222 in a suitable flow pattern through the use of an initial baffle 226 or a functional equivalent thereof. In all cases, the column of particulate material within the downcomer 212 forms a dynamic seal and an accumulation of particulate material adjacent the bottom of the column is used for controlling the introduction of the particulate material into the stream of flue gas.

The dynamic seal provided within the downcomer 212 essentially prevents the flow of air, which is at a positive pressure, to the flue gas side of the system, which is at a negative chimney draft pressure. If the seal in the downcomer 212 fails for any reason or if an irregular or interrupted flow of particulate material occurs on the flue gas side, the flue gas continues to vent by virtue of the natural draft without substantial effect upon the process to which the heat exchanger is applied. Of course, this tends to mitigate the requirements of the control process and the control apparatus for the heat exchanger 200.

The heat exchanger 200 may be controlled using devices and techniques similar to those used in connection with the heat exchanger 10. Accordingly, the automatic control arrangements 54 and 70 may be used to respectively control the flow of particulate material through the downcomers 208 and 212. To that end, trigger air is supplied through a line 232 to bias the particulate material into the lift line 210 and, in the case of the downcomer 212, it is convenient to supply trigger air through a line 234, which is subsequently divided to provide a number of angularly spaced jets of biasing trigger air adjacent the accumulation of particulate material at the bottom of the downcomer 212.

For purposes of recovering heat energy by means of heat transfer between primary and secondary fluids, the heat exchanger 200 is cocurrent in thermal performance even though countercurrent heat transfer is employed on the flue gas side of the system. This is true since cocurrent heat transfer is employed on the air side of the system and the lowest temperature to which the flue gas can be cooled is equal to the temperature of the particulate material introduced into the flue gas via the downcomer 212, which temperature is, in turn, equal to the outlet air temperature. The total significance of countercurrent heat transfer on one side of the system has not yet been fully evaluated and the operation of the zero loop system is not directly described by the above mathematical relationships for the figure 8 flow path system. However, the heat exchanger 200 has demonstrated controllable steady state operating characteristics and efficient heat recovery between primary and secondary fluids or gaseous streams.

The heat exchanger 200 was operated using a particulate material comprising tabular alumina having an 800 micron particle size. The particulate material was selected to assure its downward flow through the flue gas under the anticipated flue gas flow conditions in order to effect counter-current heat transfer and phase separation. The rate at which the particulate material falls through the flue gas is to a degree a function of the specific particulate material employed, and variations in the rate will tend to result in corresponding variations in the residence time and heat transfer. Generally, a wide range of particulate materials reflecting the considerations outlined above with respect to the figure 8 system will be useful in the zero loop system, which tends to impose a somewhat lesser physical working burden on the particulate material.

In the operation of the exchanger 200, the flow rate of the alumina was maintained in this instance by setting a constant biasing trigger air flow through line 232. The level of alumina within vessel 204 was regulated with a level control arrangement as described above and the use of a biasing trigger air flow through the line 234. The heat exchanger was operated at conditions varying over its designed range of operation and approaching its designed capacity of 500,000 BTU/hr., and at inlet flue gas temperatures as high as 2400° F. In all cases, stable steady state operation was obtained with $\alpha_a$ and $\alpha_g$ values each ranging from about 0.5 to about 15 and $\beta$ values varying from about 1.0 to about 2.5. The percent heat recovery ranged from about 35% to about 75%.

The countercurrent flow occurring on the flue gas side of the heat exchanger within the vessel 202 is characterized by a relatively lower velocity difference between the alumina particles and flue gas, as well as less turbulent flow conditions as compared with the air side of the exchanger and, accordingly, the coefficient of heat transfer on the flue gas side is less than that experienced on the air side. In view of the same, it is advantageous to operate at relatively high flow rates of particulate material and $\alpha_g$ values greater than 3. Thus, operation of the exchanger 200 at relatively high flow rates of particulate material and corresponding $\alpha_g$ values as high as 15 is desirable and quite practical, since no pressure drop penalty is experienced on the flue gas side of the exchanger. Of course, the high particulate material flow rates will also be experienced on the air side of the exchanger and they are associated with relatively higher pressure drops in the lift line 210. However, the overall pressure drop in the zero loop flow path system of the exchanger 200 will be less than that to be expected in the figure 8 flow path system of the exchanger 10, since the former eliminates the pressure drop associated with the violent mixing and conveyance of the particulate material during the heat exchange process on the flue gas side. Moreover, it is more economical to experience pressure drop on the air side of the system, since the secondary fluid flow is provided by less expensive low temperature equipment as compared with the significantly more expensive high temperature blowers or suction fans which would be required on the flue gas side of the exchanger.

The heat exchanger 200 is operable at variable flow rates of particulate material, and it has displayed variable area operation characteristics similar to those of the figure 8 system. In the heat exchanger 200, these characteristics are particularly displayed at relatively low $\alpha_g$ values, such as 3.0 or less.

The percent heat recovery is a function of the ratio of the air to flue gas flow rates or $\beta$ value. The percent heat recovery increases with increasing $\beta$ values, and the actual percent heat recovery achieved closely follows the theoretical recovery.

As demonstrated by the foregoing detailed discussion of the illustrated embodiments, gas-solids transport techniques in accordance with the present invention enable the provision of efficient and economical heat exchanger systems. To a large degree, the improvements of the present invention are a result of the simplicity of operation and functional directness of the figure 8 and zero loop flow path techniques as respectively shown in the schematic flow diagrams of FIGS. 21 and 22 with reference to the elements of the heat exchangers 10 and 200.

Figure 21:
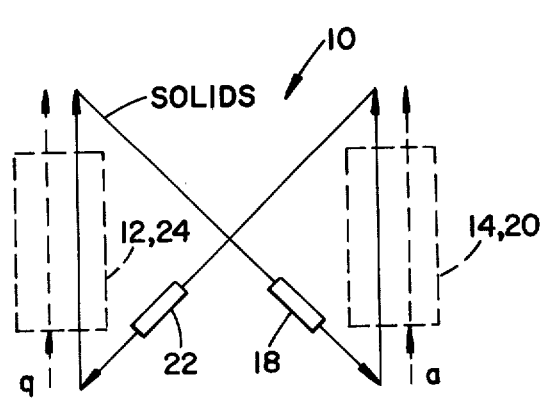
FIG. 21 is a general flow diagram for figure 8 flow path systems in accordance with the present invention.

Referring to FIG. 21, the figure 8 particulate material or solids flow path is shown by a solid line. The flue gas (g) and the air (a) streams as shown by the dotted lines are established at spaced locations in the figure 8 flow path through the use of the operating chambers 12, 24 and 14, 20. The operating chamber 12, 24 functionally corresponds with the vessel 12 and lift line 24, and the operating chamber 14, 20 functionally corresponds with the vessel 14 and lift line 20. As shown in FIG. 21, the circulating solids are passed in direct cocurrent contact with the flue gas and the air in the respective operating chambers, and the flue gas and air streams are maintained separate through the use of the dynamic seals 22 and 18 formed by the solids in the figure 8 flow path. As specifically illustrated, it is advantageous to use the dynamic seals 22 and 18 for purposes of directly introducing the solids into the flue gas and air streams.

Figure 22:
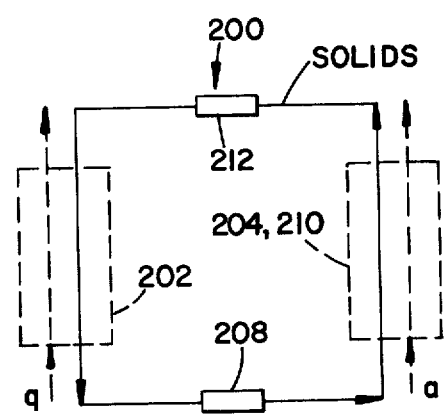
FIG. 22 is a general flow diagram for zero loop flow path systems in accordance with the present invention.

In FIG. 22, the zero loop solids flow path is again shown by a solid line and the flue gas (g) and air (a) streams are shown by the dotted lines. The flue gas stream is maintained and brought into countercurrent contact with the solids through the use of the operating chamber 202 shown at the left in FIG. 22, which corresponds with the vessel 202 in the heat exchanger 200. The air stream is brought into cocurrent contact with the solids during the pneumatic conveyance thereof through the use of the operating chamber 204, 210, which functionally corresponds with the vessel 204 and lift line 210 in the heat exchanger 200. The flue gas and air streams are maintained separate by means of dynamic seals 208 and 212 provided by the solids as they are circulated along the zero loop flow path. As indicated with respect to the figure 8 loop, the dynamic seals are used to directly introduce the solids into contact with the flue gas and air streams, as well as to maintain the separation of the streams.

The continuous solids flow path and in-line solids seals and feeds in both the figure 8 and zero loop flow path systems, as well as the use of pneumatic conveyance when cocurrent contact is desired, minimize transport functional and structural requirements. Accordingly, the systems are characterized by minimal operational requirements and they are readily integrated into other processes.

What is claimed is:

1. A method of heat exchange between gaseous media and a particulate material which provides a heat exchange surface as it is circulated between first and second vessels for direct heat transfer with gaseous media comprising respectively withdrawing said particulate material from said vessels through first and second downcomers and transferring said particulate material to associated lift lines, pneumatically conveying said particulate material to said first vessel with a first gaseous stream flowing through one of said lift lines and to said second vessel with a second gaseous stream flowing through the other of said lift lines, each of said streams undergoing a pressure drop during the pneumatic conveyance of said particulate material, cocurrently transferring heat between said particulate material and gaseous stream in each of said lift lines, separating said particulate material from each of said gaseous streams and respectively collecting said particulate material in said vessels, and transferring heat between said gaseous streams as a function of the flow rate weight ratios of said particulate material to said gaseous stream in each of said lift lines and the flow rate weight ratio of said gaseous streams.

2. A method as set forth in claim 1, wherein the flow rate of said particulate material is controlled as a function of the pressure drop of at least one of said gaseous streams in one of said lift lines.

3. A method as set forth in claim 1, wherein said pressure drop of said one gaseous stream is directly related to the flow rate of said particulate material in said one gaseous stream and inversely related to the flow rate of said one gaseous stream.

4. A method as set forth in claim 1, wherein said first gaseous stream is a heat providing fluid and said second gaseous stream is a heat receiving fluid, said flow rate weight ratio of particulate material to each of said streams is in the range of from about 1 to about 20, and said flow rate weight ratio of said second gaseous stream to said first gaseous stream is in the range of from about 1.0 to about 5.0.

5. A method as set forth in claim 1, wherein the step of withdrawing particulate material through said downcomers includes forming a loose packed bed column of particulate material in each of said downcomers and controlling the bulk density of said particulate material in each of said downcomers to provide a dynamic seal preventing net leakage flow of gaseous media through the downcomers under the influence of any pressure difference between the gaseous media at opposite ends of the downcomer.

6. A method as set forth in claim 1, wherein the step of pneumatically conveying said particulate material includes violently mixing said particulate material and gaseous stream in at least one localized zone to provide a maximized quantity of heat transfer.

7. A method of cocurrent heat exchange for direct heat transfer between gaseous media and particulate material which provides a heat exchange surface as it is circulated between first and second operating vessels comprising withdrawing particulate material from said vessels through first and second downcomers, forming a loose packed bed column of particulate material under the influence of gravity in each of said downcomers, forming an accumulation of particulate material adjacent the bottom of each of said columns to restrict the withdrawal of particulate material through said downcomers, biasing particulate material from said accumulation thereof adjacent the bottom of each of said columns into an associated lift line, pneumatically conveying said particulate material to said first vessel with a first gaseous stream flowing through one of said lift lines and to said second vessel with a second gaseous stream flowing through the other of said lift lines, cocurrently transferring heat between said particulate material and said gaseous stream in each of said lift lines and substantially completing the transfer of heat between said gaseous streams and particulate material during pneumatic conveyance, and separating said particulate material from each of said gaseous streams.

8. A method as set forth in claim 7, wherein the step of forming a loose packed bed column of particulate material in each of said downcomers includes controlling the bulk density of the particulate material in each of said downcomers to provide a dynamic seal preventing net leakage flow of gaseous media through said downcomers under the influence of any pressure difference between gaseous media at opposite ends of said downcomer.

9. A method as set forth in claim 8, wherein the step of controlling the bulk density of the particulate material includes providing at least one of said columns with sufficient height to develop a pressure head under the influence of gravity at least equal to any pressure difference between the gas media at opposite ends of said one column.

10. A method as set forth in claim 7, wherein the step of forming said accumulations includes sloping the accumulated particulate material in its natural angle of repose downwardly toward said associated lift line, and the step of biasing said particulate material includes aerating the accumulated particulate material to cause it to directly spill over into said associate lift line.

11. A method as set forth in claim 10, wherein the steps of forming said accumulations of particulate material and biasing the accumulated particulate material provide the sole valving function for the withdrawal of particulate material through said downcomers.

12. A method as set forth in claim 7, wherein at least one of said associated lift lines has a substantially cylindrical configuration, and the step of biasing the particulate material includes tangentially flowing the particulate material into said lift line to form a layer of particulate material about the inside periphery of said lift line.

13. A method as set forth in claim 7, wherein the step of separating said particulate material and gaseous streams includes collecting the separated particulate material in an inventory thereof in each of said vessels.

14. A method as set forth in claim 13, including the step of adding make-up particulate material to the inventory of particulate material in one of said vessels as a function of the level of said inventory in said one vessel.

15. A method of heat exchange between gaseous media and particulate material which provides a heat exchange surface as it is circulated between first and second operating vessels for direct heat exchange with gaseous media in a system characterized by heat exchange operating variables including gaseous media outlet temperatures and pressure drops comprising respectively withdrawing particulate material from said vessels through first and second downcomers and transferring the particulate material to associated lift lines, pneumatically conveying the particulate material to said first vessel with a first gaseous stream flowing through one of said lift lines and to said second vessel with a second gaseous stream flowing through the other of said lift lines, cocurrently transferring heat between said particulate material and said gaseous stream in each of said lift lines, separating said particulate material from each of said gaseous streams, sensing a heat exchange operating variable of said system, and varying the area of said heat exchange surface as a function of said sensed variable by controlling the rate of withdrawal of particulate material through at least one of said downcomers to recover at least one of said gaseous streams at a preselected value of said sensed operating variable.

16. A method as set forth in claim 15, wherein the step of controlling the rate of withdrawal of particulate material includes regulation of the pressure drop of the gaseous stream conveying said particulate material through said lift line associated with said one downcomer.

17. A method as set forth in claim 15, wherein said sensed heat exchange operating variable is the pressure drop of said gaseous stream conveying said particulate material through said lift line associated with said one downcomer.

18. A method as set forth in claim 15, wherein said sensed heat exchange operating variable is the outlet temperature of said one gaseous stream.

19. A method as set forth in claim 15, wherein the step of varying the area of said heat exchange surface includes controlling the rate of withdrawal of particulate material to provide a flow rate weight ratio of said particulate material to gaseous stream in each of said lift lines in the range of from about 1 to about 5.

20. A method of recovering heat from process gases comprising circulating a particulate material between first and second operating vessels in a figure 8 flow pattern, respectively withdrawing particulate material from said vessels through first and second downcomers and transferring the withdrawn particulate material to associated lift lines for pneumatic conveyance, forming a stream of a primary fluid comprising a process gas from which heat is to be recovered in one of said lift lines and a stream of a secondary fluid comprising a gaseous medium to which the recovered heat is to be transferred in the other of said lift lines, pneumatically conveying said particulate material through the respective lift lines to said vessels by means of said fluid streams, cocurrently transferring heat directly between said particulate material and fluid streams during pneumatic conveyance, separating said particulate material from said fluid streams to respectively collect said particulate material in said operating vessels, recovering said secondary fluid at a preselected elevated outlet temperature and/or pressure, and controlling the flow of said particulate material through at least one of said downcomers as a function of said preselected outlet temperature and/or pressure of the recovered secondary fluid.

21. A method as set forth in claim 20, wherein said process gas is flue gas at a temperature in excess of 750° F.

22. A method as set forth in claims 20 or 21, wherein the step of recovering said secondary fluid includes using the recovered secondary fluid as preheated combustion air in a combustion process from which said process gas is derived.

23. A method of heat exchange between separate streams of gaseous media using particulate material which is circulated along a continuous flow path for separate contact at spaced locations along the flow path with first and second gaseous streams comprising, introducing said particulate material into said first gaseous stream at a first location in said flow path for direct contact and heat transfer with the first gaseous stream as the particulate material is circulated along the flow path to a second location therein, separating said particulate material from said first gaseous stream at said second location and introducing said particulate material into said second gaseous stream for direct contact and heat transfer with said second gaseous stream as the particulate material is circulated along the flow path to said first location, separating said particulate material from said second gaseous stream at said first location and introducing the particulate material into said first gaseous stream, monitoring the pressure drop of at least one of said gaseous streams and introducing said particulate material into said at least one gaseous stream as a function of said pressure drop, and cocurrently exchanging heat between said particulate material and each of said gaseous streams during contact therewith.

24. A method as set forth in claim 23, including substantially continuously circulating said particulate along said flow path.

25. A method as set forth in claims 23 or 24, including circulating said particulate material along said flow path substantially solely by the use of pneumatic conveyance and the force of gravity.

26. A method as set forth in claim 25, wherein said particulate material is pneumatically conveyed along said flow path by each of said gaseous streams during cocurrent heat exchange therewith.

27. A method as set forth in claim 25, including introducing said particulate material into said first and second gaseous streams through substantially structurally unobstructed flow conduits located in said flow path at said first and second locations, and forming a column of particulate material in each of said flow conduits having a sufficient bulk density to prevent the net leakage flow therethrough of said gaseous streams.

28. A method as set forth in claim 25, including introducing said particulate material into at least one of said first and second gaseous streams through a substantially structurally unobstructed flow conduit located in said flow path, said flow conduit extending in a substantially vertical direction and terminating at a lower transversely extending portion, and maintaining in said flow conduit a column of particulate material having a sufficient height to develop a pressure head under the influence of gravity at least equal to any pressure difference between the gas media at opposite ends of said column.

29. a method as set forth in claim 23, including violently mixing said particulate material and each of said gaseous streams respectively in at least one localized zone during cocurrent heat exchange therewith to maximize the quantity of heat transfer.

30. A method as set forth in claim 23 wherein said pressure drop is inversely proportional to the weight flow rate of said at least one gaseous stream.

31. A method as set forth in claims 29 or 30, wherein the other of said gaseous streams comprises a hot flue gas having a temperature in excess of 750° F.

32. A method as set forth in claim 30, wherein the other of said gaseous streams comprises hot process gas.

33. A method as set forth in claim 30, wherein the other of said gaseous streams is a heat providing primary fluid and said at least one of said gaseous streams is a heat receiving secondary fluid, and said particulate material is circulated at a flow rate weight ratio to said primary fluid in the range of from about 3 to about 15.

34. A method as set forth in claim 23, wherein said first gaseous stream is a heat providing primary fluid and said second gaseous stream is a heat receiving secondary fluid, said particulate material is circulated at a flow rate weight ratio to each of said streams in the range of from about 1 to about 20, and said second gas stream has a flow rate weight ratio to said first gas stream in the range of from about 1.0 to about 5.0.

35. A method of heat transfer between separate streams of flowing gaseous media using a particulate material which is circulated between first and second operating chambers for respectively contacting first and second gaseous streams therein, comprising:
 (a) flowing said particulate material and first gaseous stream into said first operating chamber with contact between said particulate material and first gaseous stream to effect direct heat transfer therebetween, separating said particulate material from said first gaseous stream following contact therewith and collecting said particulate material for transfer to said second operating chamber;
 (b) flowing said particulate material and second gaseous stream into said second operating chamber with contact between said particulate material and second gaseous stream to effect direct heat transfer therebetween, separating said particulate material from said second gaseous stream and collecting said particulate material for return to said first operating chamber;
 (c) monitoring the pressure drop of at least one of said gaseous streams and introducing said particulate material into said at least one gaseous stream as a function of said pressure drop; and
 (d) cocurrently flowing said particulate material with each of said gaseous streams during contact therewith to effect direct cocurrent heat transfer.

36. A method as set forth in claim 35, wherein each of said gaseous streams pneumatically conveys said particulate material during contact therewith.

37. A method as set forth in claim 36, wherein said particulate material is circulated substantially solely by each of said gaseous streams and the force of gravity.

38. A method as set forth in claim 35, including transferring said particulate material between said operating chambers through substantially structurally unobstructed flow conduits and forming in each of said conduits a column of particulate material having a sufficient bulk density to prevent the net leakage flow of said first and second gaseous streams between said operating chambers.

39. A method as set forth in claim 35, including violently mixing said particulate material and each of said gaseous streams respectively in at least one localized zone during cocurrent heat exchange therewith to maximize the quantity of heat transfer.

40. A method as set forth in claim 35, wherein said pressure drop is inversely proportional to the weight flow rate of said at least one gaseous stream.

41. A method as set forth in claim 40, wherein the other of said gaseous streams comprises a hot flue gas having a temperature in excess of 750° F.

42. A method as set forth in claim 40, wherein the other of said gaseous streams comprises hot process gas.

43. A heat exchanger apparatus for providing heat transfer between separate streams of gaseous media comprising first and second vessels having a particulate material circulated therebetween in a figure 8 flow pattern, first and second lift lines for respectively confining said streams as each of said streams pneumatically conveys said particulate material with cocurrent heat transfer to an associated one of said vessels, downcomers respectively associated with each of said vessels, each of said downcomers having an upper inlet for withdrawing particulate material from said vessel and a lower outlet for transferring particulate material to an associated one of said lift lines for pneumatic conveyance of said particulate material from one of said vessels to the other of said vessels, each of sad downcomers having a substantially unobstructed cross sectional area including a substantially vertical portion between said upper inlet and lower outlet for confining said particulate material in a loose packed bed column and a laterally extending portion for accumulating and transferring said particulate material to said associated lift line, and separation means associated with each of said vessels for separating said streams and particulate material and collecting said particulate material in said vessels for withdrawal by said downcomers.

44. A heat exchanger apparatus as set forth in claim 43, including means for violently mixing said particulate material and stream in at least one localized zone during pneumatic conveyance to each of said vessels to cause the heat transfer between the gaseous media and particulate material to be substantially completed during pneumatic conveyance.

45. A heat exchanger as set forth in claim 44, wherein said means for violently mixing said particulate material and gaseous medium include a flow diverting means disposed adjacent an outlet of each of said lift lines.

46. A heat exchanger as set forth in claim 45, wherein said flow diverting means comprise a bonnet member for entrapping gaseous media and particulate material.

47. A heat exchanger as set forth in claim 44, wherein each of said downcomers includes biasing means for disturbing accumulated particulate material in said laterally extending portion thereof and causing said particulate material to directly spill through said outlet opening and into said stream of gaseous medium in said associated lift line.

48. A heat exchanger as set forth in claim 44, wherein said separation means include a cyclone member having a dip leg for directly returning separated particulate material to said associated downcomer.

49. A heat exchanger as set forth in claim 44, wherein said first and second vessels comprise a pair of horizontal cyclones.

50. A method of heat exchange between separate streams of gaseous media using particulate material which is circulated along a continuous flow path for separate contact at spaced locations along the flow path with first and second gaseous streams comprising, introducing said particulate material into said first gaseous stream at a first location in said flow path for direct contact and heat transfer with the first gaseous stream as the particulate material is circulated along the flow path to a second location therein, separating said particulate material from said first gaseous stream at said second location and providing in said flow path a loose packed bed column of said particulate which terminates at a lower accumulation of particulate material in its natural angle of repose, introducing said particulate material into said second gaseous stream by biasing said particulate material from the accumulation thereof directly into said stream for cocurrent heat transfer with said second gaseous stream as the particulate material is pneumatically conveyed along the flow path to said first location by said second gaseous stream, and separating said particulate material from said second gaseous stream at said first location and introducing the particulate material into said first gaseous stream, the step of biasing said particulate material from said accumulation including monitoring the pressure drop of said second gaseous stream during pneumatic conveyance and biasing said particulate material into said stream as a function of the pressure drop to control the flow of particulate material along the flow path.

51. A method as set forth in claim 50, wherein said first gaseous stream is a heat providing fluid comprising a hot flue gas, and the step of biasing said particulate material includes circulating said particulate material at a flow rate weight ratio to said first gaseous stream in the range of from about 3 to about 15.

52. A method as set forth in claim 50, wherein the step of providing said loose packed bed column includes adjustably confining said particulate material adjacent said accumulation thereof in said flow path to vary the natural angle of respose.

53. A method of heat exchange between separate streams of gaseous media in a system having heat exchange operating variables including gaseous media outlet temperatures and pressure drops, comprising circulating particulate material which provides a heat exchange surface along a continuous flow path for separate contact at spaced locations along the flow path with first and second gaseous streams, introducing said particulate material into said first gaseous stream at a first location in said flow path for direct contact and heat transfer with the first gaseous stream as the particulate material is circulated along the flow path to a second location therein, separating said particulate material from said first gaseous stream at said second location and introducing said particulate material into said second gaseous stream for direct contact and heat transfer with said second gaseous stream as the particulate material is circulated along the flow path to said first location, separating said particulate material from said second gaseous stream at said first location for introduction of the particulate material into said first gaseous stream, cocurrently exchanging heat between said particulate material and at least one of said gaseous streams during contact therewith, sensing at least one of said heat exchange operating variables, and varying the area of said heat exchange surface in accordance with the sensed variable's deviation from a preselected value by regulating the introduction of said particulate material into said gaseous streams at said first and second locations.

54. A method as set forth in claim 53, wherein the step of varying the area of said heat exchange surface includes regulating the introduction of said particulate material into said first gaseous stream in accordance with the sensed variable's deviation from said preselected value and regulating the introduction of said particulate material into said second gaseous stream to correspond with the introduction of particulate material into said first gaseous stream.

55. A method as set forth in claim 53, wherein said method of heat exchange is employed in a more comprehensive system having process operating variables including gaseous stream outlet temperatures and gaseous stream pressure drops, and said sensed heat exchange operating variable is a combined heat exchange and process operating variable.

56. A method as set forth in claim 55, wherein said combined heat exchange and process operating variable is a total system pressure drop.

57. A method of heat transfer between separate streams of flowing gaseous media in a system having heat exchange operating variables including gaseous media outlet temperatures and pressure drops, wherein a particulate material provides a heat exchange surface as it is circulated between first and second operating chambers for respectively contacting first and second gaseous streams therein, comprising:

(a) causing said particulate material and first gaseous stream to flow into said first operating chamber with contact between said particulate material and first gaseous stream to effect direct heat transfer therebetween, separating said particulate material from said first gaseous stream following contact therewith and collecting said particulate material for transfer to said second operating chamber;

(b) causing said particulate material and second gaseous stream to flow into said second operating chamber with contact between said particulate material and second gaseous stream to effect direct heat transfer therebetween, separating said particulate material from said second gaseous stream and collecting said particulate material for return to said first operating chamber;

(c) effecting cocurrent flow of said particulate material with at least one of said gaseous streams during contact therewith to effect direct cocurrent heat transfer;

(d) sensing at least one of said heat exchange operating variables; and (e) varying the area of said heat exchange surface in accordance with the sensed variable's deviation from a preselected value by controlling the flow of said particulate material into each of said operating chambers.

58. A method as set forth in claim 53 or claim 57, including cocurrently exchanging heat between said particulate material and the other of said gaseous streams.

* * * * *